(12) United States Patent
Nugent

(10) Patent No.: US 9,269,043 B2
(45) Date of Patent: Feb. 23, 2016

(54) MEMRISTIVE NEURAL PROCESSOR UTILIZING ANTI-HEBBIAN AND HEBBIAN TECHNOLOGY

(71) Applicant: KnowmTech, LLC, Albuquerque, NM (US)

(72) Inventor: Alex Nugent, Sante Fe, NM (US)

(73) Assignee: Knowm Tech, LLC, Santa Fe, NM (US)

( * ) Notice: Subject to any disclaimer, the term of this patent is extended or adjusted under 35 U.S.C. 154(b) by 313 days.

(21) Appl. No.: 13/908,410

(22) Filed: Jun. 3, 2013

(65) Prior Publication Data

US 2014/0156576 A1 Jun. 5, 2014

Related U.S. Application Data

(63) Continuation-in-part of application No. 12/938,537, filed on Nov. 3, 2010, now abandoned, and a continuation-in-part of application No. 12/974,829, filed on Dec. 21, 2010, now Pat. No. 8,781,983, and a (Continued)

(51) Int. Cl.
*G06N 3/08* (2006.01)
*G06N 3/04* (2006.01)

(52) U.S. Cl.
CPC ..................... *G06N 3/049* (2013.01)

(58) Field of Classification Search
CPC ................ G06N 3/049; G06N 3/08
USPC ..................................... 706/21, 25
See application file for complete search history.

(56) References Cited

U.S. PATENT DOCUMENTS

| | | | |
|---|---|---|---|
| 2,707,223 | A | 4/1955 | Hollman |
| 3,222,654 | A | 12/1965 | Widrow |
| 3,585,615 | A | 6/1971 | Takahashi et al. |
| 3,833,894 | A | 9/1974 | Aviram et al. |
| 3,947,828 | A | 3/1976 | Meijer |
| 4,041,953 | A | 8/1977 | Anderson et al. |
| 4,802,951 | A | 2/1989 | Clark et al. |
| 4,926,064 | A | 5/1990 | Tapang |
| 4,974,146 | A | 11/1990 | Works et al. |

(Continued)

FOREIGN PATENT DOCUMENTS

| | | |
|---|---|---|
| EP | 1 022 764 A1 | 7/2000 |
| EP | 1 046 613 A2 | 10/2000 |

(Continued)

OTHER PUBLICATIONS

Nugent M. et al., "AHaH Computing—From Metastable Switches to Attractors to Machine Learning", PLOS ONE, Feb. 2014, vol. 9, Issue 2, e85175.*

(Continued)

*Primary Examiner* — Jeffrey A Gaffin
*Assistant Examiner* — Dave Misir
(74) *Attorney, Agent, or Firm* — Kermit D. Lopez; Luis M. Ortiz; Ortiz & Lopez, PLLC

(57) ABSTRACT

An AHaH (Anti-Hebbian and Hebbian) apparatus for use in electronic circuits. Such an AHaH apparatus can include one or more meta-stable switches, and one or more differential pairs of output electrodes, wherein each electrode among each differential pair of output electrodes can include one or more input lines coupled thereto via one or more of the meta-stable switch.

20 Claims, 8 Drawing Sheets

Related U.S. Application Data continuation-in-part of application No. 13/113,167, filed on May 23, 2011, and a continuation-in-part of application No. 13/354,537, filed on Jan. 20, 2012, now Pat. No. 8,909,580, and a continuation-in-part of application No. 13/370,569, filed on Feb. 10, 2012, which is a continuation-in-part of application No. 12/100,586, filed on Apr. 10, 2008, now Pat. No. 8,156,057, and a continuation of application No. 10/969,789, filed on Oct. 21, 2004, now Pat. No. 7,398,259, and a continuation-in-part of application No. 10/730,708, filed on Dec. 8, 2003, now abandoned, which is a continuation-in-part of application No. 10/226,191, filed on Aug. 22, 2002, now abandoned, said application No. 10/969,789 is a continuation-in-part of application No. 10/748,631, filed on Dec. 30, 2003, now Pat. No. 7,412,428, and a continuation-in-part of application No. 10/748,546, filed on Dec. 30, 2003, now Pat. No. 7,392,230, and a continuation-in-part of application No. 10/730,708, filed on Dec. 8, 2003, now abandoned, application No. 13/908,410, which is a continuation-in-part of application No. 12/226,191, filed on Dec. 10, 2008, now Pat. No. 8,293,712, which is a continuation-in-part of application No. 10/162,524, filed on Jun. 5, 2002, now abandoned, which is a continuation-in-part of application No. 10/095,273, filed on Mar. 12, 2002, now Pat. No. 6,889,216, application No. 13/908,410, which is a continuation-in-part of application No. 13/421,398, filed on Mar. 15, 2012, now Pat. No. 9,104,975, which is a continuation-in-part of application No. 12/938,537, and a continuation-in-part of application No. 13/354,537, and a continuation-in-part of application No. 13/268,119, filed on Oct. 7, 2011, now abandoned, which is a continuation-in-part of application No. 13/113,167, filed on May 23, 2011, which is a continuation-in-part of application No. 12/974,829, which is a continuation-in-part of application No. 12/938,537, which is a continuation-in-part of application No. 12/612,677, filed on Nov. 5, 2009, now Pat. No. 8,332,339, which is a continuation-in-part of application No. 12/100,586, which is a continuation of application No. 10/969,789, which is a continuation-in-part of application No. 10/748,631, filed on Dec. 30, 2003, now Pat. No. 7,412,428, application No. 13/908,410, which is a continuation-in-part of application No. 10/748,546, which is a continuation-in-part of application No. 10/730,708, said application No. 12/612,677 is a continuation-in-part of application No. 10/162,524, which is a continuation-in-part of application No. 10/095,273, application No. 13/908,410, which is a continuation-in-part of application No. 13/602,797, filed on Sep. 4, 2012, now Pat. No. 8,983,886, and a continuation-in-part of application No. 13/614,623, filed on Sep. 13, 2012, now Pat. No. 8,990,136, which is a continuation-in-part of application No. 13/608,058, filed on Sep. 10, 2012, application No. 13/908,410, which is a continuation-in-part of application No. 13/613,700, filed on Sep. 13, 2012, and a continuation-in-part of application No. 13/616,811, filed on Sep. 14, 2012, now Pat. No. 8,972,316, said application No. 13/421,398 is a continuation-in-part of application No. 10/226,191.

(60) Provisional application No. 60/458,024, filed on Mar. 27, 2003.

(56) References Cited

U.S. PATENT DOCUMENTS

| | | |
|---|---|---|
| 4,988,891 A | 1/1991 | Mashiko |
| 5,058,184 A | 10/1991 | Fukushima |
| 5,293,455 A | 3/1994 | Castelaz |
| 5,315,162 A | 5/1994 | McHardy et al. |
| 5,422,983 A | 6/1995 | Castelaz et al. |
| 5,475,794 A | 12/1995 | Mashiko |
| 5,589,692 A | 12/1996 | Reed |
| 5,649,063 A | 7/1997 | Bose |
| 5,670,818 A | 9/1997 | Forouhi et al. |
| 5,680,481 A | 10/1997 | Prasad et al. |
| 5,699,234 A | 12/1997 | Saia et al. |
| 5,706,404 A | 1/1998 | Colak |
| 5,717,832 A | 2/1998 | Steimle et al. |
| 5,761,115 A | 6/1998 | Kozicki et al. |
| 5,783,840 A | 7/1998 | Randall et al. |
| 5,794,224 A | 8/1998 | Yufik |
| 5,812,993 A | 9/1998 | Ginosar et al. |
| 5,822,721 A | 10/1998 | Johnson et al. |
| 5,896,312 A | 4/1999 | Kozicki et al. |
| 5,904,545 A | 5/1999 | Smith et al. |
| 5,914,893 A | 6/1999 | Kozicki et al. |
| 5,920,852 A | 7/1999 | Graupe |
| 5,940,529 A | 8/1999 | Buckley |
| 5,951,881 A | 9/1999 | Rogers et al. |
| 5,978,782 A | 11/1999 | Neely |
| 6,026,358 A | 2/2000 | Tomabechi |
| 6,084,796 A | 7/2000 | Kozicki et al. |
| 6,128,214 A | 10/2000 | Kuekes et al. |
| 6,171,239 B1 | 1/2001 | Humphrey |
| 6,245,630 B1 | 6/2001 | Ishikawa |
| 6,248,529 B1 | 6/2001 | Connolly |
| 6,256,767 B1 | 7/2001 | Kuekes et al. |
| 6,282,530 B1 | 8/2001 | Huang |
| 6,294,450 B1 | 9/2001 | Chen et al. |
| 6,308,155 B1 | 10/2001 | Kingsbury et al. |
| 6,314,019 B1 | 11/2001 | Kuekes et al. |
| 6,330,553 B1 | 12/2001 | Uchikawa et al. |
| 6,335,291 B1 | 1/2002 | Freeman |
| 6,339,227 B1 | 1/2002 | Ellenbogen |
| 6,359,288 B1 | 3/2002 | Ying et al. |
| 6,363,369 B1 | 3/2002 | Liaw et al. |
| 6,383,923 B1 | 5/2002 | Brown et al. |
| 6,389,404 B1 | 5/2002 | Carson et al. |
| 6,407,443 B2 | 6/2002 | Chen et al. |
| 6,418,423 B1 | 7/2002 | Kambhatla et al. |
| 6,420,092 B1 | 7/2002 | Yang et al. |
| 6,422,450 B1 | 7/2002 | Zhou et al. |
| 6,423,583 B1 | 7/2002 | Avouris et al. |
| 6,424,961 B1 | 7/2002 | Ayala |
| 6,426,134 B1 | 7/2002 | Lavin et al. |
| 6,445,006 B1 | 9/2002 | Brandes et al. |
| 6,536,106 B1 | 3/2003 | Jackson et al. |
| 6,616,327 B1 | 9/2003 | Kearney et al. |
| 6,620,346 B1 | 9/2003 | Schulz et al. |
| 6,687,686 B1 | 2/2004 | Nervegna et al. |
| 6,763,340 B1 | 7/2004 | Burns et al. |
| 6,798,692 B2 | 9/2004 | Kozicki et al. |
| 6,855,329 B1 | 2/2005 | Shakesheff et al. |
| 6,889,216 B2 | 5/2005 | Nugent |
| 6,910,010 B2 | 6/2005 | Iwahashi et al. |
| 6,995,649 B2 | 2/2006 | Nugent |
| 6,996,758 B1 | 2/2006 | Herron et al. |
| 7,028,017 B2 | 4/2006 | Nugent |
| 7,039,619 B2 | 5/2006 | Nugent |
| 7,082,394 B2 | 7/2006 | Burges et al. |
| 7,107,252 B2 | 9/2006 | Nugent |
| 7,225,343 B1 | 5/2007 | Honig et al. |
| 7,353,516 B2 | 4/2008 | Heidari-Bateni et al. |
| 7,392,230 B2 | 6/2008 | Nugent |
| 7,398,259 B2 | 7/2008 | Nugent |
| 7,409,375 B2 | 8/2008 | Nugent |
| 7,412,428 B2 | 8/2008 | Nugent |
| 7,420,396 B2 | 9/2008 | Nugent |
| 7,426,501 B2 | 9/2008 | Nugent |
| 7,502,769 B2 | 3/2009 | Nugent |

(56) References Cited

U.S. PATENT DOCUMENTS

| | | |
|---|---|---|
| 7,574,740 B1 | 8/2009 | Kennis |
| 7,599,895 B2 | 10/2009 | Nugent |
| 7,681,245 B2 | 3/2010 | Walker et al. |
| 7,711,491 B2 | 5/2010 | Vandersall et al. |
| 7,729,964 B2 | 6/2010 | Senturk et al. |
| 7,739,211 B2 | 6/2010 | Coffman et al. |
| 7,752,151 B2 | 7/2010 | Nugent |
| 7,770,153 B2 | 8/2010 | Chilimbi et al. |
| 7,770,225 B2 | 8/2010 | Hammond |
| 7,814,548 B2 | 10/2010 | Mukhopadhyay et al. |
| 7,827,130 B2 | 11/2010 | Nugent |
| 7,827,131 B2 | 11/2010 | Nugent |
| 7,853,049 B2 | 12/2010 | Lee et al. |
| 7,880,499 B2 | 2/2011 | Manohar et al. |
| 7,921,459 B2 | 4/2011 | Houston et al. |
| 7,930,257 B2 | 4/2011 | Nugent |
| 8,022,732 B2 | 9/2011 | Nugent |
| 8,041,653 B2 | 10/2011 | Nugent |
| 8,051,021 B2 | 11/2011 | Aggarwal et al. |
| 8,103,102 B2 | 1/2012 | Chien et al. |
| 8,140,584 B2 | 3/2012 | Guha |
| 8,165,979 B2 | 4/2012 | Aggarwal et al. |
| 2001/0004471 A1 | 6/2001 | Zhang |
| 2001/0023986 A1 | 9/2001 | Mancevski |
| 2001/0024633 A1 | 9/2001 | Lee et al. |
| 2001/0031900 A1 | 10/2001 | Margrave et al. |
| 2001/0041160 A1 | 11/2001 | Margrave et al. |
| 2001/0044114 A1 | 11/2001 | Connolly |
| 2002/0001905 A1 | 1/2002 | Choi et al. |
| 2002/0004028 A1 | 1/2002 | Margrave et al. |
| 2002/0004136 A1 | 1/2002 | Gao et al. |
| 2002/0016703 A1 | 2/2002 | Barroux |
| 2002/0030205 A1 | 3/2002 | Varshavsky |
| 2002/0075126 A1 | 6/2002 | Reitz et al. |
| 2002/0086124 A1 | 7/2002 | Margrave et al. |
| 2002/0090468 A1 | 7/2002 | Goto et al. |
| 2002/0102353 A1 | 8/2002 | Mauthner et al. |
| 2003/0031438 A1 | 2/2003 | Kambe et al. |
| 2003/0048619 A1 | 3/2003 | Kaler et al. |
| 2003/0177450 A1 | 9/2003 | Nugent |
| 2003/0182246 A1 | 9/2003 | Johnson et al. |
| 2003/0236760 A1 | 12/2003 | Nugent |
| 2004/0015970 A1 | 1/2004 | Scheuermann |
| 2004/0039717 A1 | 2/2004 | Nugent |
| 2004/0150010 A1 | 8/2004 | Snider |
| 2004/0153426 A1 | 8/2004 | Nugent |
| 2004/0162796 A1 | 8/2004 | Nugent |
| 2004/0193558 A1 | 9/2004 | Nugent |
| 2004/0249319 A1 | 12/2004 | Dariush |
| 2005/0015351 A1 | 1/2005 | Nugent |
| 2005/0039185 A1 | 2/2005 | Heidari-Bateni et al. |
| 2005/0090641 A1 | 4/2005 | Valluzzi et al. |
| 2005/0149464 A1 | 7/2005 | Nugent |
| 2005/0149465 A1 | 7/2005 | Nugent |
| 2005/0151615 A1 | 7/2005 | Nugent |
| 2005/0215239 A1 | 9/2005 | Kopra et al. |
| 2005/0256816 A1 | 11/2005 | Nugent |
| 2006/0036559 A1 | 2/2006 | Nugent |
| 2006/0136411 A1 | 6/2006 | Meyerzon et al. |
| 2006/0184466 A1 | 8/2006 | Nugent |
| 2007/0005532 A1 | 1/2007 | Nugent |
| 2007/0022064 A1 | 1/2007 | Nugent |
| 2007/0040848 A1 | 2/2007 | Hutchinson et al. |
| 2007/0117221 A1 | 5/2007 | Nugent et al. |
| 2007/0176643 A1 | 8/2007 | Nugent |
| 2007/0192267 A1 | 8/2007 | Hawkins et al. |
| 2007/0192268 A1 | 8/2007 | Hawkins et al. |
| 2007/0239999 A1 | 10/2007 | Honig et al. |
| 2008/0258773 A1 | 10/2008 | Nugent |
| 2009/0043722 A1 | 2/2009 | Nugent |
| 2009/0112779 A1 | 4/2009 | Wolf et al. |
| 2009/0138419 A1 | 5/2009 | Nugent |
| 2009/0228415 A1 | 9/2009 | Nugent |
| 2009/0228416 A1 | 9/2009 | Nugent |
| 2009/0234899 A1 | 9/2009 | Kramer |
| 2009/0304436 A1 | 12/2009 | Brennan et al. |
| 2010/0280982 A1 | 11/2010 | Nugent |
| 2010/0299297 A1 | 11/2010 | Breitwisch et al. |
| 2011/0031999 A1 | 2/2011 | Beat |
| 2011/0137843 A1 | 6/2011 | Poon et al. |
| 2011/0145179 A1 | 6/2011 | Nugent |
| 2011/0161268 A1 | 6/2011 | Nugent |
| 2012/0042255 A1 | 2/2012 | Vaidya et al. |
| 2012/0044476 A1 | 2/2012 | Earhart et al. |
| 2012/0078827 A1 | 3/2012 | Nugent |
| 2012/0092645 A1 | 4/2012 | Inokuchi |
| 2012/0110411 A1 | 5/2012 | Cheung et al. |
| 2012/0124113 A1 | 5/2012 | Zalik et al. |

FOREIGN PATENT DOCUMENTS

| | | |
|---|---|---|
| EP | 1 069 206 A2 | 1/2001 |
| EP | 0 989 579 A3 | 3/2001 |
| EP | 1 100 106 A2 | 5/2001 |
| EP | 1 115 135 A1 | 7/2001 |
| EP | 1 134 304 A2 | 9/2001 |
| EP | 1 483 737 B1 | 3/2011 |
| RU | 2071126 C1 | 12/1996 |
| WO | WO 00/44094 A1 | 7/2000 |
| WO | WO 03/017282 A1 | 2/2003 |

OTHER PUBLICATIONS

"A Basic Introduction to Neural Networks"; http://blizzard.gis.uiuc.edu/htmldocs/Neural/neural.html (2002) printed Feb. 15, 4 pages.

"A New Class of Nanostructure: Semiconducting "Nanobelts" Offer Potential for Nanosensors and Nanoelectronics," Mar. 12, 2001, http://www.sciencedaily.com/releases/2001/03/010309080953.htm, 3 pages.

"Nanoparticles Get Wire," Sciencenow, Aug. 28, 1997, Dimes Institute, Delft University of Technology, 1 page.

"Neural Networks," StatSoft, Inc., http://www.statsoft.com/textbook/neural-networks/ (2002) Mar. 4, 30 pages.

"Quantum-Dot Arrays for Computation," ORNL Review vol. 34, No. 2, 2001, pp. 1-5, http://www.ornlgov/ORNLReview/v34_2_01/arrays.htm.

Adriani, P. M. et al., "Electrical-field-induced aggregation in dilute colloidal suspensions," (1990) Faraday Discussions of the Chemical Society, 16-29.

Ananthanarayanan, R. et al., "The Cat is Out of the Bag: Cortical Simulations with $10^9$ Neurons, $10^{13}$ Synapses," SC09 Nov. 14-20, 2009, Portland, Oregon, 12 pages.

Anantram, M. P., "Transport through carbon nanotube wires," Computational Electronics (2000) pp. 43-44.

Anderson, D. et al., "Artificial Neural Networks Technology," A DACS (Data & Analysis Center for Software) State-of-the-Art Report, Contract No. F30602-89-C-0082, ELIN: A011, Rome Laboratory RL/C3C, Griffiss Air Force Base, New York, Aug. 20, 1992, 87 pages.

Anderson, M. K., "Mega Steps Toward the Nanochip," Wired News, Apr. 27, 2001, 3 pages.

Andriotis et al., "Various bonding configurations of transition-metal atoms on carbon nanotubes: Their effect on contact resistance," Applied Physics Letters (2000) 76(26):3890-3892, Jun. 26.

Appenzeller, J. et al., "Optimized contact configuration for the study of transport phenomena in ropes of single-wall carbon nanotubes," Applied Physics Letters (2001) 78(21):3313-3315, May 21.

Avouris, P. et al., "Carbon nanotubes: nanomechanics, manipulation, and electronic devices," Applied Surface Science (1999) 141:201-209.

Avouris, P., "Molecular Electronics with Carbon Nanotubes," Accounts of Chemical Research (2002) 35(12):1026-1034, Jul. 31.

Bag, S. et al. "Topographic Feature Extraction for Bengali and Hindi Character Images," Signal & Image Processing: An International Journal (SIPIJ) (2011) 2(21:181-196.

Bandow, S. et al., "Purification of Single-Wall Carbon Nanotubes by Microfiltration," J. Phys. Chem. B (1997) 101:8839-8842.

Bégin, J. et al. "Categorization in Unsupervised Neural Networks: The Eidos Mode," IEEE Transactions on Neural Networks (1996) 7(1):147-154.

(56) References Cited

OTHER PUBLICATIONS

Bezryadin, A. et al., "Evolution of avalanche conducting states in electrorheological liquids," Physical Review E (1999) 59(6): 6896-6901, Jun. 1999.
Bezryadin, A. et al., "Self-assembled chains of graphitized carbon nanoparticles," Applied Physics Letters (1999) 74(18): 2699-2701, May 3.
Bezryadin, A. et al., "Electrostatic trapping of single conducting nanoparticles between electrodes," Applied Physics Letters (1997) 71(9): 1273-1275, Sep. 1.
Bezryadin, A. et al., "Self-assembled chains of graphitized carbon nanoparticles" Dec. 21, 1998, 11 pages.
Bezryadin, A. et al., "Trapping Single Particle with Nanoelectrodes," Physics News Graphics, Sep. 1997, 5 pages.
Bieberich, E., "Recurrent fractal neural networks: a strategy for the exchange of local and global information processing in the brain," BioSystems (2002) 66:145-164.
Bradley, K. et al., "Influence of Mobile Ions on Nanotube Based FET Devices," Nano Letters (2003) 3(5):639-641, Apr. 4.
Bradley, K. et al., "Flexible Nanotube Electronics," Nano Letters (2003) 3(10):1353-1355, Aug. 9.
Cameron, K. et al., "Spike Timing Dependent Plasticity (STDP) can Ameliorate Process Variations in Neuromorphic VLSI," IEEE Transactions on Neural Networks (2005) 16(6):1626-1637.
Chandola, V. et al., "Anomaly Detection: A Survey," ACM Computing Surveys (2009) 41(3), 72 pages, Article 15, July.
Chen, X. Q. et al., "Aligning single-wall carbon nanotubes with an alternating-current electric field," Applied Physics Letters (2001) 78(23): 3714-3716, Jun. 4.
Chung, J. et al., "Nanoscale Gap Fabrication and Integration of Carbon Nanotubes by Micromachining," Solid-State Sensor, Actuator and Microsystems Workshop, Jun. 2-6, 2002; Hilton Head Island, South Carolina, pp. 161-164.
Chung, J. et al., "Nanoscale Gap Fabrication by Carbon Nanotube-Extracted Lithography (CEL)", Nano Letters (2003) 3(8): 1029-1031, July.
Clark, D. W., "An Introduction to Neural Networks"; http://members.home.net/neuralnet/introtonn/index.htm (1997), 6 pages.
CMP Cientifica, "Nanotech: the tiny revolution," Nov. 2001, 30 pages.
Collins, P. G. et al., "Engineering Carbon Nanotubes and Nanotube Circuits Using Electrical Breakdown," Science (2001) 292:706-709, Apr. 27.
Collins, P. G. et al., "Nanotubes for Electronics," Scientific American Dec. 2000, pp. 62-69.
Declaris, J.-W. et al., "An Introduction to Neural Networks," http://www.ee.umd.edu/medlab/neural/nn1.html, last modified Jul. 20, 1997, 4 pages.
Derycke, V. et al., "Carbon Nanotube Inter- and Intramolecular Logic Gates," Nano Letters (2001) 1(9):453-456.
Diehl, M. R. et al., "Self-Assembled, Deterministic Carbon Nanotube Wiring Networks," Angew. Chem. Int. Ed. (2002) 41(2):353-356.
Donald, J. et al., "An adaptive neural processing node," IEEE Transactions on Neural Networks (1993) 4(3):413-426, May.
Duan, X. et al., "Indium phosphide nanowires as building blocks for nanoscale electronic and optoelectronic devices," Nature (2001) 409: 66-69, Jan. 4.
Dubson, M. A. et al., "Measurement of the conductivity exponent in two-dimensional percolating networks: Square lattice versus random-void continuum", Physical Review B (1985) 32(11): 7621-7623, Dec. 1.
Dyke, C. A. et al., "Unbundled and Highly Functionalized Carbon Nanotubes from Aqueous Reactions," Nano Letters(2003) 3(9): 1215-1218, Aug. 19.
Ellenbogen, J. C. et al., "Architecture for Molecular Electronic Computers: 1. Logic Structure and an Adder Design for Molecular Electronic Diodes," Proceedings of the IEEE (2000) 88(3):386-426.
Espejo, S. et al., "A 16×16 Cellular Neural Network Chip for Connected Component Detection," Jun. 30, 1999; http://www.imse.cnm.csic.es/Chipcat/espejo/chip-2.pdf, 3 pages.
Farries, M. A. et al., "Reinforcement Learning with Modulated Spike Timing-Dependent Synaptic Plasticity," J. Neurophysiol. (2007) 98:3648-3665.
Frank, D.J. et al., "Highly efficient algorithm for percolative transport studies in two dimensions", Physical Review B (1988) 37(1): 302-307, Jan. 1.
Fujita, O., "Statistical estimation of the number of hidden units for feedforward neural networks," Neural Networks (1998) 11:851-859.
Gerousis, C. et al., "Modeling Nanoelectronic CNN Cells: CMOS, SETs and QCAs," IEEE International Symposium on Circuits and Systems, May 28-31, 2000, 4 pages.
Golding, N. L. et al., "Dendritic spikes as a mechanism for cooperative long-term potentiation", Nature (2002) 418: 326-330, Jul. 18.
Graf, H. P. et al., "Advances in Neural Network Hardware," Electron Devices Meeting 1988. Technical Digest, International Dec. 11-14, pp. 766-769.
Gurney, K., "An Introduction to Neural Networks," (1999) pp. 39, 51 and 115.
Harnack, O. et al., "Rectifying Behavior of Electrically Aligned ZnO Nanorods," Nano Letters(2003)3(8):1097-1101; Jun. 24.
Harte, A., "Liquid Crystals Allow Large-Scale Alignment of Carbon Nanotubes," CURJ (Caltech Undergraduate Research Journal), Nov. 2001, vol. 1, No. 2, pp. 44-49.
Heinze, S. et al., "Carbon Nanotubes as Schottky Barrier Transistors", Physical Review Letters (2002) 89(10):106801-1 to 106801-4, Sep. 2.
Hermanson, K. D. et al., "Dielectrophoretic Assembly of Electrically Functional Microwires from Nanoparticle Suspensions," Science (2001) 294(5544): 1082-1086, Nov. 2.
Hone, J. et al., "Electrical and thermal transport properties of magnetically aligned single wall carbon nanotube films," Applied Physics Letters (2000) 77(5): 666-668. Jul. 31.
Hong, S.H. et al., Controllable Capture of Au Nano-Particles by Using Dielectrophoresis, Journal of the Korean Physical Society (2004) 45:5665 5668, December.
Imtiaz, H. et al., "A Face Recognition Scheme Using Wavelet-Based Dominant Features," Signal & Image Processing: An International Journal (SIPIJ) (2011) 2(3):69-80.
Jabri, M.A. et al., "Adaptive Analog VLSI Neural Systems," Chapman & Hall, London SE1 8HN, UK, 1996, pp. 92-95.
Jarosz, A. et al., "An Introductory Note on Gaussian Correlated Random Matrix," Feb. 21, 2003, pp. 1-20 http://www.if.uj.edu.pl/pl/kotoSMP/prace/mdmatrix.pdf.
Jones, S. "Neural Networks and the Computational Brain or Matters relating to Artificial Intelligence," The Brain Project Mar. 4, 2002, http://www.culture.com.au/brain_proj/neur_net.htm, 17 pages.
Jones, T.B., "Frequency-dependent orientation of isolated particle chains," Journal of Electrostatics (1990) 25:231-244.
Jordan, T. C. et al., "Electrorheology," IEEE Transactions on Electrical Insulation (1989) 24(5):849-878.
Karmarkar, U. R. et al., "Mechanisms and significance of spike-timing dependent plasticity," Biol. Cybern. (2002) 87:373-382, Jan. 28.
Karmarkar, U. R. et al., "A Model of Spike-Timing Dependent Plasticity: One or Two Coincidence Detectors?", J. Neurophysiol. (2002) 88:507-513, July.
Krupke, R. et al., "Simultaneous Deposition of Metallic Bundles of Single-walled Carbon Nanotubes Using Ac-dielectrophoresis," Nano Letters (2003) 3(8):1019-1023; Jul. 9.
Krupke, R. et al., "Contacting single bundles of carbon nanotubes with alternating electric fields," Appl. Phys. A. (2003) 76:397-400.
Krupke, R. et al., "Separation of Metallic from Semiconducting Single-Walled Carbon Nanotubes," Science (2003) 301: 344-347, Jul. 18.
Kumar, M. S. et al., "Influence of electric field type on the assembly of single walled carbon nanotubes," Chemical Physics Letters (2004) 383: 235-239, Dec. 2.

(56) References Cited

OTHER PUBLICATIONS

Kushner, S. A. et of, "Modulation of Presynaptic Plasticity and Learning by the H-ras/Extracellular Signal-Regulated Kinase/Synapsin I Signaling Pathway," The Journal of Neuroscience (2005) 25(42):9721-9734.

Landman, U. et al.; "Metal-Semiconductor Nanocontacts: Silicon Nanowires," Physical Review Letters (2000) 85(9):1958-1961, Aug. 28.

Law. M. et al., "Photochemical Sensing of $NO_2$ with $SnO_2$ Nanoribbon Nanoserisors at Room Temperature," Angew. Chem. (2002) 114, Nr. 13, pp. 2511-2514.

Landman, U. et al., "Metal-Semiconductor Nanocontacts: Silicon Nanowires," Physical Review Letters (2000) 85(9):1958-1961, Aug. 28.

Lee, S.W. et al., "Dielectrophoresis and electrohydralynarnics-mediated fluidic assembly of silicon resistors," Appllied Physics Letters (2003) 83(18): 3833-3835, Nov. 3, 2003.

Leonardi, A. et al., "Simulation methodology for dielectrophoresis in microelectronic Lab-on-a-chip," Modeling and Simulation of Microsystems (2002), pp. 96-99.

Lipson, H. et al., "Automatic Design and Manufacture of Robotic Lifeforms," Nature (2000) 406: 974-978, Aug. 31.

Liu, J. et al., "Fullerene Pipes," Science (1998) 280: 1253-1255, May 22.

Liu, X. et al., "Electric-Field-Induced Accumulation and Alignment of Carbon Nanotubes," 2002 Annual Report Conference on Electrical Insulation and Dielectric Phenomena (2002) IEEE, pp. 31-34.

Maass, W. et al., "Computational Models for Generic Cortical Microcircuits," Institute for Theoretical Computer Science, Technische Universitaet Graz; Gras, Austria, Jun. 10, 2003; pp. 1-26.

Maass, W., "Noisy Spiking Neurons with Temporal Coding have more Computational Power than Sigmoidal Neurons," Advances in Neural information Processing Systems (1997) Mozer, M. et al. eds., vol. 9, MIT Press (Cambridge), pp. 1-13.

Maass, W., "On the Relevance of Time in Neural Computation and Learning," Proc. of the 8th International Conference on Algorithmic Learning Theory in Sendai (Japan) (1997) Li, M. et al., eds., vol. 1316 of Lecture Notes in Computer Science, pp. 364-388.

Mandischer, M. et al., "Neural Networks and Evolutionary Algorithms for the prediction of thermodynamic properties for chemical engineering," Simulated Evolution and Learning Lecture notes in Computer Science (1999) 1585:106-113.

Martel, R. et al., "Ambipolar Electrical Transport in Semiconducting Single-Wall Carbon Nanotubes," Physical Review Letters (2001) 87(25): 256805-1 to 256805-4, Dec. 17.

Masquelier, T. et al., "Competitive STDP-Based Spike Pattern Learning," Neural Computation (2009) 21:1259-1276.

Masquelier, T. et al., "Unsupervised Learning of Visual Features through Spike Timing Dependent Plasticity," PLoS Comput. Biol. (2007) 3(2): 0247-0257.

Mehrotra, K., et al., "Elements of Artificial Neural Networks" (1997) MIT Press, 13 pages.

Meyer, S. A. et al., "Computational neural networks: a general purpose tool for nanotechnology," Abstract, 5th Foresight Conference on Molecular Nanotechnology; http://www.islandone.org/Foresight/Conferences/MNT05/Abstracts/Meyeabst.html Sep. 4, 1997, 3 pages.

Middleton, A. A. et al., "Collective Transport in Arrays of Small Metallic Dots," Physical Review Letters (1993) 71(19):3198-3201.

Mitchell, G., "Sub-50 nm Device Fabrication Strategies," Project No. 890-00, Cornell Nanofabrication Facility, Electronics—p. 90-91, National Nanofabrication Users Network, created Apr. 3, 2008.

Moon, J.-M. et al., "High-Yield Purification Process of Singlewalied Carbon Nanotubes," J. Phys. Chem. B (2001) 105:5677-5681.

Moore, V. C. et al., "Individually Suspended Single-Walled Carbon Nanotubes in Various Surfactants," Nano Letters (2003) 3(10):1379-1382, Sep. 9.

Nagahara, L. A. et al., "Directed placement of suspended carbon nanotubes for nanometer-scale assembly," Applied Physics Letters (2002) 80(20):3825-3828, May 20.

Niyogi, S. et al., "Chromatographic Purification of Soluble Single-Walled Carbon Nanotubes (s-SWNTs)," J. Am. Chem. Soc. (2001) 123(4):733-734.

O'Connor, P. et al.. "CMOS Preamplifier with High Lincarity and Ultra Low Noise for X-Ray Spectroscopy," IEEE Transactions on Nuclear Science (1997) 44(3):318-325, Jun. 3.

Olson, S., "Startup combines nanotechnology with neural nets," Sep. 18, 2002, Geek.com, http://www.geek.com/newsbeta2/geeknews/2002Sep/bch20020918016396.htm, 4 pages.

Orders of magnitude (power)—Wikipedia, printed Aug. 28, 2012, 7 pages.

Ota, Y. et al., "Analog implementation: of pulse-coupled neural networks," IEEE Transactions on Neural Networks (1999) 10(3):539-544, May.

Pati, Y. C. et al., "Neural Networks for Tactile Perception," Systems Research Center and Dept. of Electrical Engineering, University of Maryland and U.S. Naval Research Laboratory. 1987; http://www.isr.umd.edu/TechReports/ISR/1987/TR_87-123/TR_87-123.phtml, 17 pages.

Paulson, S. et al., "Tunable Resistance of a Carbon Nanotube-Graphite Interface," Science (2000) 290: 1742-1744, Dec. 1.

Perrinet, L. et al., "Coherence detection in a spiking neuron via Hebbian learning," Neurocomputing, 2002, vol. 44-46, No. C., pp. 817-822, http://www.laurent.perrinet.free.fr/publl/perrinet02.pdf.

Perrinet, L. et al., "Emergence of filters from natural scenes in a sparse spike coding scheme," Neurocomputing (2003) pp. 1-14, http://www.laurent.perrinet.free.fr/publi/perrinet03neurocomputing.pdf.

Pethig, R., Dielectric and Electronic properties of biological materials (1979), John Wiley & Sons, The Gresham Press, Old Woking, Surrey, 383 pages.

Pirio, G. et al., "Fabrication and electrical characteristics of carbon nanotube field emission microcathodes with an integrated gate electrode," Nanotechnology (2002) 13:1-4, Oct. 2.

Pobitzer, A. et al, "Energy-scale Aware Feature Extraction for Flow Visualization," Eurographics/IEEE Symposium on Visualization (2011) 30(3):771-780.

Press Release, "Nanowire-based electronics and optics comes one step closer," Eureka Alert, American Chemical Society, Feb. 1, 2002, http://www.eurekalert.org/pub_releases/2002-02/acs-nea020102.php, 2 pages.

Press Release, "Toshiba Demonstrates Operation of Single-Electron Transistor Circuit at Room Temperature," Toshiba, Jan. 10, 2001, 2 pages.

Rakovic, D., "Hierarchical Neural Networks and Brainwaves: Towards a Theory of Consciousness," Brain & Consciousness: Proc. ECPD Workshop (1997) Rakic, L. et al., eds., Belgrade, Yugoslavia, pp. 189-204.

Roberts, P. D. et al., "Model of auditory prediction in the dorsal cochlear nucleus via spike-timing dependent plasticity," Neurocomputing (2006) 69:1191-1194.

Rotman, D., "Molecular Memory, Replacing silicon with organic molecules could mean tiny supercomputers," Technology Review, May 2001, p. 46.

Saito, O. et al., "A 1M Synapse Self-Learning Digital Neural Network Chip," ISSCC (1998) pp. 6.5-1 to 6.5-10; IEEE.

Schaper, C. D., "Patterned Transfer of Metallic Thin Film Nanostructures by Water-Soluble Polymer Templates," Nano Letters (2003) 3(9): 1305-1309, Jul. 26.

Schoenbach, K. H., et al., "Bioelectrics-New Applications for Pulsed Power Technology," IEEE Digest of Technical Papers on Pulsed Power Plasma Science, Jun. 2001, vol. 1, pp. 21-28.

Schultz, W., "Multiple Reward Signals in the Brain," Neuroscience (2000) 1:199-207.

Smith, L., "An Introduction to Neural Networks," Center for Cognitive and Computational Neuroscience, Dept. of Computing & Mathematics, University of Stirling. Oct. 25, 1996; http//www.cs.stir.ac.uk/~iss/NNIntro/InvSlides.html, 10 pages.

Smith, B. W., et al., "Structural anisotropy of magnetically aligned single wall carbon nanotube films," Applied Physics Letters (2000) 77(5): 663-665, Jul. 31.

(56) References Cited

OTHER PUBLICATIONS

Smith, P. A. et al., "Electric-field assisted assembly and alignment of metallic nanowires," Applied Physics Letters (2000) 77(9):1399-1401, Aug. 28.
Snow, E. S. et al., "Nanofabrication with Proximal Probes," Proceedings of the IEEE (1997) 85(4):601-611, April.
Snow, E.S. et al., "Random networks of carbon nanotubes as electronic material", Applied Physics Letters (2003) 82(13): 2145-2147, Mar. 31.
Spooner, J. G., "Tiny tubes mean big chip advances," Cnet News.com Tech News First, Apr. 26, 2001, 3 pages.
Srivastava, D. et al., "Computational nanotechnology with carbon nanotubes and fullernes", Computing in Science & Engineering (2001) 3(4):42-55, Jul/Aug.
Suzuki, S. et al., "Quantitative Analysis of DNA Orientation in Stationary AC Electric Fields Using Fluorescence Anisotropy," IEEE Transactions of Industry Applications (1998) 34(1): 75-93, January/February.
Thakoor, S. et al., "Solid-State thin-film memistor for electronic neural networks", Journal of Applied Physics (1990) 67(6):3132-3135, Mar. 15.
Thottan, M. et al, "Anomaly Detection in IP Networks," IEEE Transactions on Signal Processing (2003) 51(8):2191-2204.
Tohji, K. et al., "Purifying single walled nanotubes," Nature (1996) 383:679, Oct. 24.
Tour, J. et al., "Nanocell Logic Gates for Molecular Computing," iEEE Transactions on Nanotechnology (2002) 1(2):100-109, June.
Tour, J.M. et al., "NanoCell Electronic Memories," J.Am.Chem.Soc. (2003) 125(43): 13279-13283.
Turel, O., et al., "Possible nanoelectronic implementation of neuromorphic networks", Proceedings of the International Joint Conference on Neural Networks (2003) 1:365-370, Jul. 20-24.
Van Rossum, M.C.W. et al., "Stable Hebbian Learning from Spkke-Timing-Dependent Plasticity",The Journal of Neuroscience (2003) 20(23):3812-8821, Dec. 1.
Van Schaik, A., "Building blocks for electronic spiking neural networks," Neural Networks (2001) 14:617-628.
Weeks, B. L. et al., "High-pressure nanolithography using low-energy electrons from a scanning tunneling microscope," Institute of Physics Publishing, Nanotechnology (2002) 13: 38-42; Dec. 12.
Wei, B. Q. et al., "Reliability and current carrying capacity of carbon nanotubes," Applied Physics Letters (2001) 79(8): 1172-1174, Aug. 20.
Weiss, P., "Circuitry in a nanowire: Novel growth method may transform chips," Science News Online (2002) 161(6): Feb. 9, 4 pages.
Westervelt, R. M. et al., "Molecular Electronics," NSF Functional Nanostructures Grant 9871810, NSF Partnership in Nanotechnology Conference, Jan. 29-30, 2001; http://www.unix.oit.umass_edu/~nano/NewFiles/FN19_Harvard.pdf, 3 pages.
Xie, X. et al., "Spike-based learning rules and stabilization of persistent neural activity," Advances in Neural Information Processing Systems (2000) 12:199-205.
Yamamoto, K. et al., "Orientation and purification of carbon nanotubes using ac electrophoresis," J. Phys. D: Appl. Phys (1998) 31:L34-L36.
Yang, Z. et al., "Vision Coincidence Detection with STDP Adaptation for Object Recognition and Depth Analysis," Brain Inspired Cognitive Systems (2004) University of Stirling, Scotland, UK, Aug. 29-Sep. 1, 6 pages.
Yufik, Y. M., "Virtual Associative Networks: A Framework for Cognitive Modeling," Brian and Values: Is a Biological Science of Values Possible (1998) Lawrence Erlbaum Associates, Inc., Pribram, K. H. (ed.), Mahway, NJ, pp. 109-177.
Yufik, Y. M. et al., "Swiss Army Knife and Ockham's Razor: Modeling and Facilitating Operator's Comprehension in Complex Dynamic Tasks," IEEE Transactions on Systems, Man, and Cybernetics—Part A: Systems and Humans (2002) 32(2):185-199.
Yufik, Y. M., "How the Mind Works: An Exercise in Pragmatism," Inst. of Med. Cybern. Inc. (2002) Gaithersburg, MD, 5 pages.
Zaumseil, J. et al., "Three-Dimensional and Multilayer Nanostructures Formed by Nanotransfer Printing," Nano Letters (2003) 3(9):1223-1227, Jul. 31.
Zhao, G., "Synaptic modification and entrained phase are phase dependent in STDP" Nature Proceedings May 28, 2008, 25 pages.
Zheng, L. et al., "Towards Single Molecule Manipulation with Dielectrophoresis Using Nanoelectrodes," IEEE-NANO 2003, Aug. 12-14, 2003, Moscone Convention Center, San Francisco, CA; pp. 437-440, http://ieeenano2003.arc.nasa.gov/program_contents.pdf.
Zweifel, L. S. et al., "Functions and Mechanisms of Retrograde. Neurotrophin Signalling," Nature Reviews, Neuroscience (2005) 6:615-625, August.

* cited by examiner

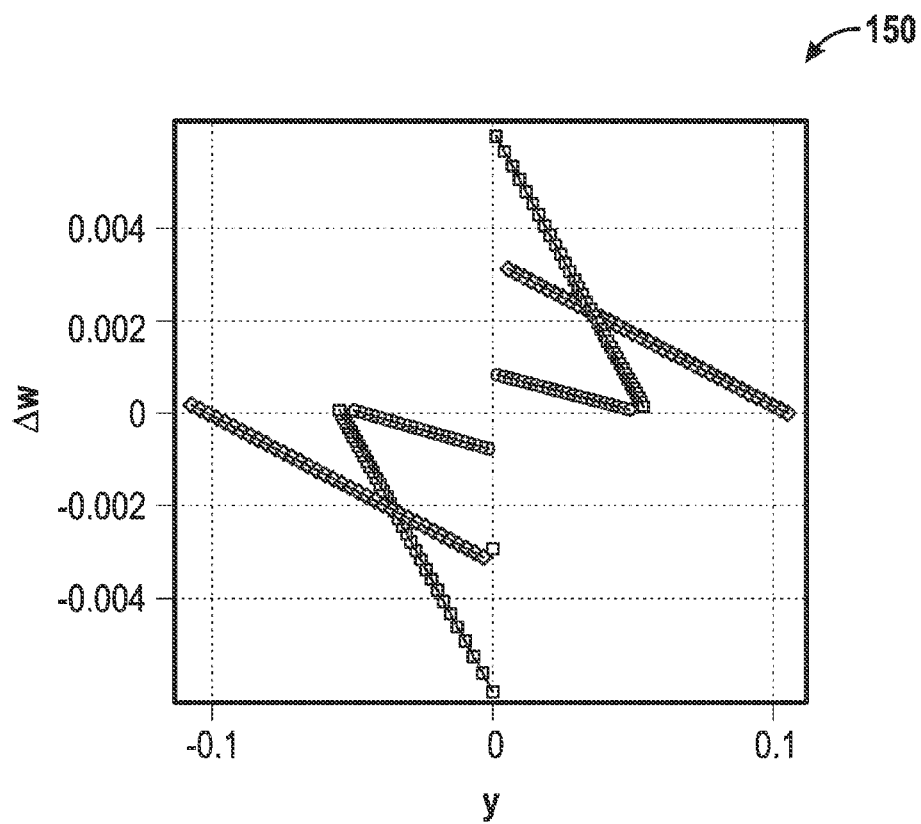
FIG. 5
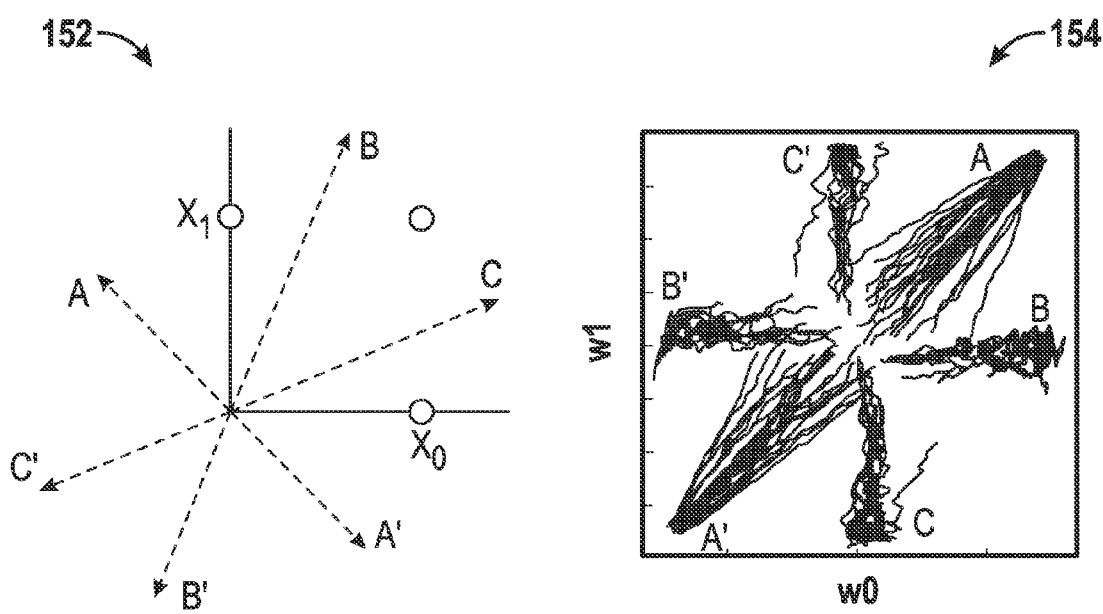
FIG. 6A
FIG. 6B

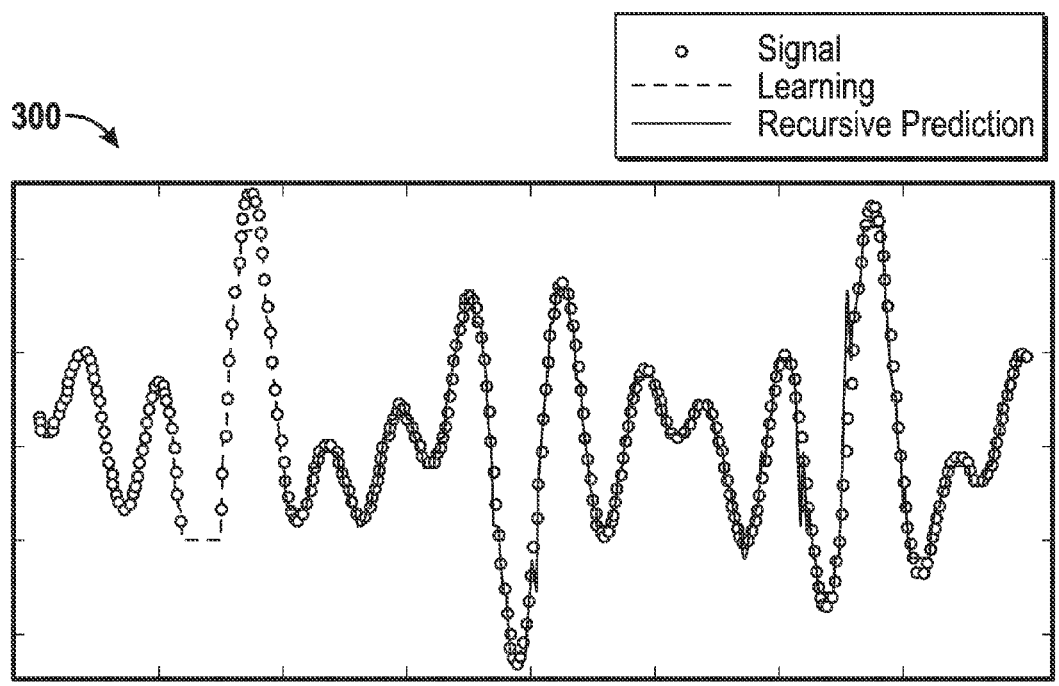
FIG. 11
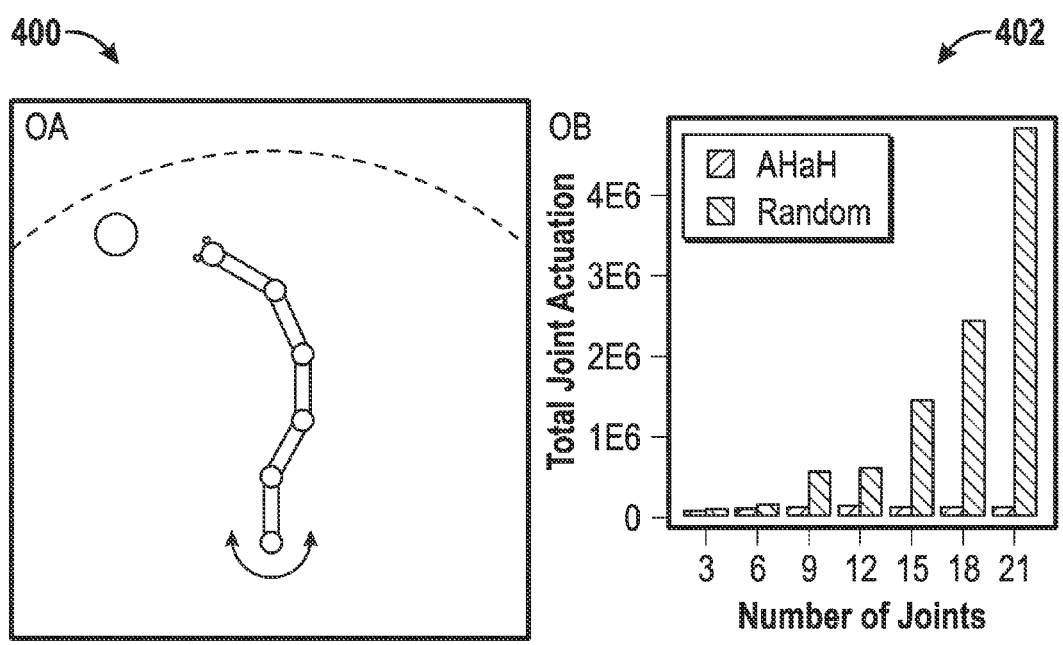
FIG. 12A
FIG. 12B

MEMRISTIVE NEURAL PROCESSOR UTILIZING ANTI-HEBBIAN AND HEBBIAN TECHNOLOGY

CROSS-REFERENCE TO PATENT APPLICATIONS

This patent application is a Continuation-in-Part of U.S. patent application Ser. No. 12/938,537 entitled "Framework for the Organization of Neural Assemblies," which was filed on Nov. 3, 2010 and is incorporated herein by reference in its entirety. This patent application is also a Continuation-in-Part of U.S. patent application Ser. No. 12/974,829 entitled "Framework for the Evolution of Electronic Neural Assemblies Toward Directed Goals," which was filed on Dec. 21, 2010 and is incorporated herein by reference in its entirety. This patent application is additionally a Continuation-in-Part of U.S. patent application Ser. No. 13/113,167 entitled "Self-Organizing Circuits," which was filed on May 23, 2011 and is incorporated herein by reference in its entirety. This patent application is also a Continuation-in-Part of U.S. patent application Ser. No. 13/354,537 entitled "Methods and Systems for Thermodynamic Evolution," which was filed on Jan. 20, 2012 and is incorporated herein by reference in its entirety.

This patent application is also a Continuation-in-Part of U.S. patent application Ser. No. 13/370,569 entitled "Physical Neural Network" which was filed on Feb. 10, 2012 and is incorporated by reference in its entirety. U.S. patent application Ser. No. 13/370,569 traces and claims its earliest priority date to U.S. patent application Ser. No. 10/095,273, which was filed on Mar. 12, 2002.

This patent application is also a Continuation-in-Part of U.S. patent application Ser. No. 13/421,398 entitled "Memristor Apparatus" which was filed on Mar. 15, 2012 and is incorporated by reference in its entirety. U.S. patent application Ser. No. 13/421,398 traces and claims its earliest priority date to U.S. patent application Ser. No. 10/095,273, which was filed on Mar. 12, 2002.

This patent application is also a Continuation-in-Part of U.S. patent application Ser. No. 13/602,797 entitled "Self-Evolvable Logic Fabric," which was filed on Sep. 4, 2012 and is incorporated by reference in its entirety. This patent application is also a Continuation-in-Part of U.S. patent application Ser. No. 13/614,623 entitled "Methods and Systems for Fractal Flow Fabric," which was filed on Sep. 13, 2012 and is incorporated herein by reference in its entirety. This patent application is also a Continuation-in-Part of U.S. patent application Ser. No. 13/608,058 entitled "Anomaly Detection Utilizing Energy Flow Networks" which was filed on Sep. 10, 2012 and is incorporated herein by reference in its entirety. This patent application is also a Continuation-in-Part of U.S. patent application Ser. No. 13/613,700 entitled "Methods and Systems for Feature Extraction of Surface Manifolds," which was filed on Sep. 13, 2012 and is incorporated herein by reference in its entirety. This patent application is also a Continuation-in-Part of U.S. patent application Ser. No. 13/616,811 entitled "Extensible Adaptive Classification Framework," which was filed on Sep. 14, 2012 and is incorporated herein by reference.

FIELD OF THE INVENTION

Embodiments are generally related AHaH (Anti-Hebbian and Hebbian) devices, components, and methods thereof. Embodiments also relate to memristor devices and components for configuring and constructing memristors. Embodiments are further related to the field of AI (Artificial Intelligence), including machine and deep learning, and physical/hardware and software based devices and components. Embodiments also relate to MNP (Memristive Neural Processor) devices, components, and electronic circuits and applications thereof.

BACKGROUND

A number of technological and economic pressures currently exist to develop a new type of electronics. Often-cited Moore's law gives us hope for optimism. Moore's second law, however, is making it clear that a transition is upon us. As our devices approach the atomic scale they become noisy and prone to faults in production and use. Opposite to the consumer trend of price reduction, the costs for producers to fulfill Moore's law are increasing dramatically. At the same time it is becoming increasingly dearly that current computing approaches are not going to meet the challenges we face in adaptive autonomous controllers. The power-discrepancy between biological solutions and our advanced computing systems is so large that it points to a flaw in our notions of what computing is. FIG. 1 illustrates a graphic depicting data indicating that it is not physically feasible to simulate biology at even moderate fidelity. A simple thought experiment also illustrates this point.

Suppose we were to simulate the human body at a moderate fidelity such that each cell of the body was allocated to one CPU, and that the distance between memory and processor was distance d. At an operating voltage V=1 and d=1cm, this simulation would consume at minimum 100GW of power, or about the total peak power consumption of France, as indicated by the following formulation:

$$10^4 \frac{\text{variable}}{\text{cell}} \times 1 \frac{\text{bit}}{\text{variable}} \times 10^{14} \frac{\text{cell}}{\text{human}} \times 10^5 \frac{\text{update}}{\text{sec}} =$$

$$10^{23} \frac{\text{bit} \cdot \text{update}}{\text{human} \cdot \text{sec}} \frac{\text{energy}}{\text{bit} \cdot \text{update}} = \frac{CV^2}{2} = 10^{-10} dV^2 \frac{\text{Joules}}{\text{bit} \cdot \text{update}}$$

$$\frac{\text{Joules}}{\text{human} \cdot \text{sec}} 10^{-10} V^2 \frac{\text{Joules}}{\text{bit} \cdot \text{update}} \times 10^{23} \frac{\text{bit} \cdot \text{update}}{\text{human} \cdot \text{sec}}$$

If we lowered the voltage to the thermodynamic limit of V=0.025V (kT at room temperature) and the CPU-memory distance to the diameter of an average cell, d=10$^{-5}$ m, it would still consume 62.5 kW, which is 625 times as much energy as is actually consumed by the human body. Turning the problem around, we can ask just how small a distance between memory and process would be required if we set the operating voltage to 70 mV, the resting potential of a neuron. The distance between the CPU and memory would need to be 2 nm or less for the simulation to equal the efficiency of biology. If these numbers seem unbelievable, we can forgo the thought experiment and point to actual data. Consider IBM's recent cat-scale cortical simulation of 1 billion neurons and 10 trillions synapses.

This effort required 147,456 CPU's and ran at $\frac{1}{100}^{th}$ real time. At a power consumption of 20 W per CPU, this is 3 megawatts. If we presume perfect scaling, a real-time simulation would consume 100× more power: 300 megawatts. A human brain is ~20 times larger than a cat, so that a real-time simulation of a network at the scale of a human would consume 6 GW if done with traditional serial processors. This is 600 million times more energy than a human brain actually dissipates. The cortex represents a fraction of the total neurons in a brain, neurons represent a fraction of the total cells in a brain, and the IBM neuron model was extremely simplified. The number of adaptive variables under constant modification in the IBM simulation is orders of magnitude less than the biological counterpart and yet its power dissipation is orders of magnitude larger.

If our aim is the creation of computing systems with power efficiencies comparable to biology, as we will need if we want autonomous controllers, then we cannot compute in the traditional sense. We cannot simulate a brain. We must build a brain. There is no distinction between memory and processing in living systems and brains, and it is exactly this distinction that is at the heart of our problems. Our solution is to define a new type of computing based on the self-organization of nature. Nature is capable of building structures of far greater complexity than any modern chip, and it is capable of doing it while embedded in the real world, not a clean room.

If the principles of autonomous self-organization were illuminated it would cascade through all parts of our world economy. Self-organizing circuits would dramatically reduce the cost of fabrication by increasing yields, as circuits could adapt around faults. The ability to heal, a natural consequence of attractor-based self-organization, leads to enhanced survival in hostile environments. However, these are just some of the peripheral benefits. Consider that every CPU currently in existence requires a program that was created by a brain: a self-organizing autonomous control system. Any application that must interact with a complex changing environment is a potential platform for self-organizing autonomous control circuitry.

The solution to our problem is all around us in nature, which displays a most remarkable property. The atoms in our bodies recycle in a matter of months. Despite the fact that life is inherently volatile, it can maintain it structure and fight decay so long as energy is dissipated. It is this property of self-repair that is at the heart of self-organization. Indeed, if a system was capable of self-repair then it should be capable of self-organization, since repair of structure is the same thing as building a structure. We can accomplish this incredible feat through the use of attractor dynamics. Just as a ball will roll into a depression, an attractor-based system will inevitable fall into its attractor. Perturbations will be quickly "fixed" as the system re-converges to its attractor. If we cut ourselves we heal. To bestow this property on our computing technology we must find a way to represent our computing structures as a fixed-point attractor. To understand how to solve the problem, we must first understand what sort of attractors we need.

Two types of attractors exist that could offer a solution to this solicitations stated problem, intrinsic and extrinsic. Extrinsic attractors are most suitable for information-processing systems. An example of an intrinsic attractor is the famous Lorenz attractor. Three partial differential equations with three constants are iterated in time, producing incremental advances in the x, y and z position of a particle. Over time, this particle traces out the familiar "butterfly wings" strange attractor seen in Error: Reference source not found. The Lorenz attractor displays its dynamics without the influence of an outside force. Energy is expended in evolving the system in time, but the nature of this evolution is governed exclusively by the intrinsic properties of the Lorenz equation. An example of intrinsic attractor in Nature would be, for example, the body of an organism. The intrinsic attractor that builds the body is specified by the intrinsic information of the DNA and will evolve in time toward a fixed-point. That is, an organism could be grown in two very different environments but will still evolve in time to have the same body configuration.

This is of course not true with a brain, which is an example of an extrinsic attractor. The structure of the brain is a reflection of the structure of the information it is processing. Another example of an extrinsic attractor is a fast-flowing river. The structure of the rapids is created from the water flowing over the streambed. Countless molecules of water come and go, but the structure of the rapids remains the same. Without the underlying streambed, however, the structure would quickly dissipate. Three ingredients are necessary for an extrinsic attractor. First, energy must be dissipated. In the river this is provided by the gravitation gradient. Second, the water must interact with itself and the environment (the stream bed) according to a plasticity rule. In the river, the inter-molecular forces of water provide this. Third, there must be external structure. This is the streambed.

The present inventor has identified a non-linear plasticity rule referred to as anti-Hebbian and Hebbian (AHAH) learning and has demonstrated that its attractor states are a reflection of the underlying structure of the information. The present inventor has shown that the attractor states represent logic functions that form a universal set and they correspond to points of maximal support vectors, which allows for optimally extracting patter regularities or features. AHAH generally refers to "Anti-Hebbian and Hebbian". Hence, "AHAH plasticity" refers to "Anti-Hebbian and Hebbian plasticity".

One non-limiting example of an application of an AHAH plasticity rule is disclosed in U.S. Pat. No. 7,398,259 entitled "Training of a Physical Neural Network," which is incorporated herein by reference. Another non-limiting example of an AHaH plasticity rule is disclosed in U.S. Pat. No. 7,409,375 entitled "Plasticity-induced Self Organizing Nanotechnology for the Extraction of Independent Components from a Data Stream," which is also incorporated herein by reference. A further non-limiting example of an AHAH plasticity rule is disclosed in U.S. Pat. No. 7,412,428 entitled "Application of Hebbian and Anti-Hebbian Leaning to Nanotechnology-Based Physical Neural Networks," which is incorporated herein by reference.

An additional non-limiting example of an AHAH plasticity rule is disclosed in U.S. Pat. No. 7,420,396 entitled "Universal Logical Gate Utilizing Nanotechnology," which is incorporated herein by reference. Another non-limiting example of an AHAH plasticity rule is disclosed in U.S. Pat. No. 7,502,769 entitled "Fractal Memory and Computational Methods and Systems Based on Nanotechnology," which is incorporated herein by reference. A further non-limiting example of an AHAH plasticity rule is disclosed in U.S. Pat. No. 7,599,895 entitled "Methodology for the Configuration and Repair of Unreliable Switching Elements," which is incorporated herein by reference. Another non-limiting example of an AHAH plasticity rule is disclosed in U.S. Pat. No. 7,827,130 entitled "Fractal Memory and Computational Methods and Systems Based on Nanotechnology".

An additional non-limiting example of an AHAH plasticity rule is disclosed in U.S. Pat. No. 7,930,257 entitled "Hierarchical Temporal Memory Utilizing Nanotechnology". A further non-limiting example of an AHAH plasticity rule is disclosed in U.S. Pat. No. 8,022,732 entitled "Universal Logic Gate Utilizing Nanotechnology". Another example of an AHAH plasticity rule is disclosed in U.S. Pat. No. 8,041,653 entitled "Method and System for a Hierarchical Temporal Memory Utilizing a Router Hierarchy and Hebbian and Anti-Hebbian Learning," which is incorporated herein by reference.

The present inventor has designed a number of artificial neural network and AI synaptic solutions, methods, systems and devices. Non-limiting examples of artificial network, synaptic and other AI solutions are disclosed in the following issued patents, which are incorporated herein by reference: U.S. Pat. Nos. 6,889,216; 6,995,649; 7,028,017; 7,039,619; 7,107,252; 7,392,230; 7,398,259; 7,409,375; 7,412,428; 7,420,396; 7,426,501; 7,502,769; 7,599,895; 7,752,151; 7,827,130; 7,827,131; 7,930,257; 8,022,732; 8,041,653; 8,156,057; 8,311,958; and 8,332,339.

One of the problems with current processing and memory based computing systems is the power consumed and the communication burden. Reducing the communication burden of the system is important as it will vastly reduce the total consumed power. Also, the ability to efficiently and quickly grow effective procedures or algorithms is a much sought after feature that has yet to be implemented based on current computing paradigms and approaches. It is therefore believed that a need exists for a new approach to computing, which reduces power consumption and the communication burden while vastly increasing speed and processing power. Such an approach is described in greater detail herein.

A number of technological and economic pressures currently exist in the development of new types of electronics. Recent advancements in quantum computing, MEMS, nanotechnology, and molecular and memristive electronics offer new and exciting avenues for extending the limitations of conventional von Neumann digital computers. As device densities increase, the cost of R&D and manufacturing has skyrocketed due to the difficulty of precisely controlling fabrication at such a small scale. New computing architectures are needed to ease the economic pressures described by what has become known as Moore's second law: The capital costs of semiconductor fabrication increases exponentially over time. We expend enormous amounts of energy constructing the most sterile and controlled environments on earth to fabricate modern electronics. Life however is capable of assembling and repairing structures of far greater complexity than any modern chip, and it is capable of doing so while embedded in the real world, and not a clean room.

IBM's cat-scale cortical simulation of 1 billion neurons and 10 trillion synapses, for example, required 147,456 CPUs, 144 TB of memory, and ran at $\frac{1}{83}$rd real time. At a power consumption of 20 W per CPU, this is 2.9 MW. If we presume perfect scaling, a real-time simulation would consume 83× more power or 244 MW. At roughly thirty times the size of a cat cortex, a human-scale cortical simulation would reach over 7 GW. The cortex represents a fraction of the total neurons in a brain, neurons represent a fraction of the total cells, and the IBM neuron model was extremely simplified. The number of adaptive variables under constant modification in the IBM simulation is orders of magnitude less than the biological counterpart and yet its power dissipation is orders of magnitude larger. The power discrepancy is so large it calls attention not just to a limit of our current technology but also to a deficiency in how we think about computing.

Brains have evolved to move bodies through a complex and changing world. In other words, brains are both adaptive and mobile devices. If we wish to build practical artificial brains with power and space budgets approaching biology we must merge memory and processing into a new type of physically adaptive hardware.

BRIEF SUMMARY

The following summary of the invention is provided to facilitate an understanding of some of the innovative features unique to the disclosed embodiments, and is not intended to be a full description. A full appreciation of the various aspects of the invention can be gained by taking the entire specification, claims, drawings, and abstract as a whole.

It is, therefore, one aspect of the disclosed embodiments to provide AHaH components and devices, such as, for example an AHAH node.

It is yet another aspect of the disclosed embodiments to provide AHAH-based components capable of configuring memristors.

It is another aspect of the disclosed embodiments to form an adaptive synaptic weight from a differential pair of memristors and Anti-Hebbian and Hebbian plasticity.

It is a further aspect of the disclosed embodiments to provide for a physical synaptic component that can be added to integrated circuit devices for machine learning applications.

It is also an aspect of the disclosed embodiments to provide for a MNP (Memristive Neural Processor).

It is also an aspect of the disclosed embodiments to provide for differential arrays of synaptic weights to form a neural node circuit, the attractor states of which are logic functions that form a computationally complete set.

It is yet another aspect of the disclosed embodiments to provide for a universal machine learning building block circuit, which can be composed of a differential pair of output electrodes, wherein each electrode comprises a plurality of input lines coupled to it via collections of meta-stable switches.

The aforementioned aspects and other objectives and advantages can now be achieved as described herein. Biology has evolved intelligent creatures built from volatile neural components, which have the ability to successfully navigate in and adapt to a constantly changing environment to seek and consume energy used to sustain and propagate life. The fact that living organisms can do what they do given limited energy budgets is furthermore astounding. Advances in computing, machine learning, and artificial intelligence have failed to even come close to the bar that nature has set. Therefore we believe a completely new approach to computing needs to be invented that is based on biology's volatile low-power solution. The research presented here proposes one such approach, avoiding the barriers hampering current von Neumann-based systems. The recent appearance of memristive circuits has now made it possible to add a synaptic-like electronic component to establish silicon integrated devices paving the way for this new type of computing.

The meta-stable switch model disclosed herein can be configured for memristors and used to model physical devices, such as, for example, the Ag-Chalcogenide device from Boise State University and the Ag—Si device from the University of Michigan. We form an adaptive synaptic weight from a differential pair of memristors and AHaH plasticity. Differential arrays of synaptic weights are used to form a neural node circuit, the attractor states of which are logic functions that form a computationally complete set.

Furthermore, we demonstrate a path from low-level simulation of meta-stable switching elements to memristive devices, synaptic weights, neural nodes and finally high-level machine learning functions such as spike encoding, unsupervised clustering, supervised and unsupervised classification, complex signal prediction, unsupervised robotic actuation and combinatorial optimization—all of which are key capabilities of biological nervous systems as well as modern machine learning algorithms with real-world application. Finally, we demonstrate unsupervised clustering and supervised classification in memristor-level hardware simulations.

Via the AHaH technology disclosed herein, a robust and proven-feasible path from real-world memristive devices to MNP architectures can be implemented, which accelerates the full spectrum of machine learning algorithms, from optimal classification to clustering, combinatorial optimization, and robotic control to name a few.

BRIEF DESCRIPTION OF THE FIGURES

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

FIG. 5 illustrates a graph depicting data indicative the AHaH rule generated from an AHaH node, in accordance with aspects of the disclosed embodiments;

FIG. 6 illustrates an input space diagram and a graph depicting attracting attractor states of a two-input AHaH node, in accordance with aspects of the disclosed embodiments;

FIG. 11 illustrates a graph depicting complex signal prediction with an AHaH classifier, in accordance with aspects of the disclosed embodiments;

FIG. 12 illustrates a diagram (left) of an unsupervised robotic arm challenge and a graph depicting data thereof, in accordance with the disclosed embodiments;

DETAILED DESCRIPTION

Figure 1:
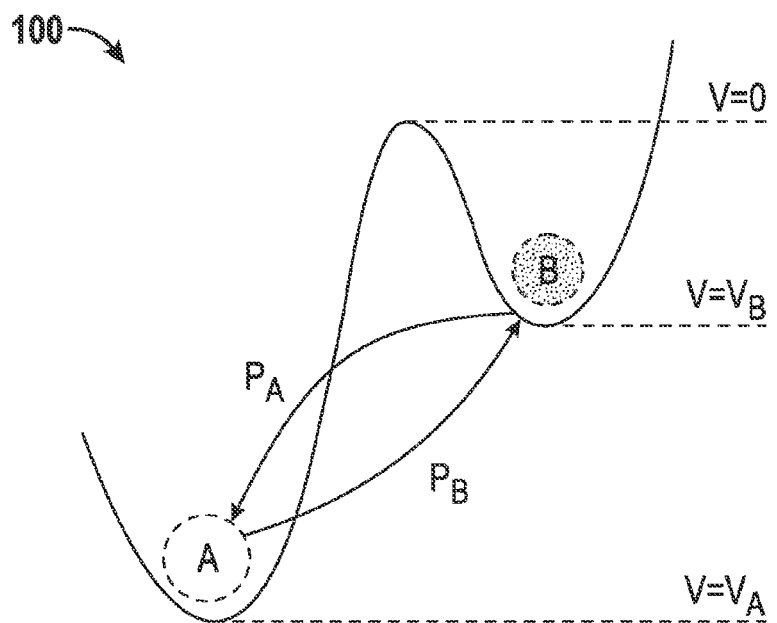
FIG. 1 illustrates a graph depicting a MSS (Meta-stable Switch) which can be incorporated into a MNP, in accordance with aspects of the disclosed embodiments.

The particular values and configurations discussed in these non-limiting examples can be varied and are cited merely to illustrate an embodiment of the present invention and are not intended to limit the scope of the invention.

The disclosed embodiments described herein generally cover a three-fold purpose. First, such embodiments reveal the common hidden assumption of non-volatility in computer engineering and how this mindset is fundamentally at odds with biology and physics and likely responsible for the extreme power discrepancy between modern computing technologies and biological nervous systems. Second, a simple adaptive circuit and functional model is discussed herein, which can be configured from collections of meta-stable (e.g., volatile) switches and used as a foundational building block to construct higher order machine learning capabilities. Third, we demonstrate how a number of core machine learning functions such as clustering, classification, and robotic actuation can be derived from our adaptive building block. When taken all together we hope to show that a relatively clear path exists between the technology of today and the adaptive physically self-organizing neuromorphic processors of tomorrow.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Note that the term "module" as utilized herein may refer to a physical module or component such as electrical component/hardware and/or the term "module" may refer to computer software (e.g., a software module, program module, etc), computer programs, subroutines, routines, etc. Generally, program modules include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, handheld devices, multi-processor systems, data networks, microprocessor-based or programmable consumer electronics, networked personal computers, minicomputers, mainframe computers, servers, and the like.

It can be appreciated the disclosed framework may be implemented in the context of hardware (e.g., as an IC chip) and/or as computer software, module, etc., for carrying out instructions/algorithms, etc. Thus, the disclosed framework can be implemented as a hardware IC chip, software modules, etc., or a combination thereof.

Note that as utilized herein, the term "AHA" or "AHaH" generally refers to "Anti-Hebbian and Hebbian". Hence, "AHaH plasticity" refers to "Anti-Hebbian and Hebbian plasticity" and an "AHaH Node" refers to a neuron model that implements AHaH plasticity. One non-limiting example of an application of an AHaH plasticity rule is disclosed in U.S. Pat. No. 7,398,259, which is incorporated herein by reference. Another non-limiting example of an AHaH plasticity rule is disclosed in U.S. Pat. No. 7,409,375, which is also incorporated herein by reference. A further non-limiting example of an AHaH plasticity rule is disclosed in U.S. Pat. No. 7,412,428, which is incorporated herein by reference.

An additional non-limiting example of an AHaH plasticity rule is disclosed in U.S. Pat. No. 7,420,396, which is incorporated herein by reference. Another non-limiting example of an AHaH plasticity rule is disclosed in U.S. Pat. No. 7,502,769 entitled, which is incorporated herein by reference. A further non-limiting example of an AHaH plasticity rule is disclosed in U.S. Pat. No. 7,599,895, which is incorporated herein by reference. Another non-limiting example of an AHaH plasticity rule is disclosed in U.S. Pat. No. 7,827,130, which is incorporated herein by reference An additional non-limiting example of an AHaH plasticity rule is disclosed in U.S. Pat. No. 7,930,257, which is incorporated herein by reference. A further non-limiting example of an AHaH plasticity rule is disclosed in U.S. Pat. No. 8,022,732, which is incorporated herein by reference. Another non-limiting example of an AHaH plasticity rule is disclosed in U.S. Pat. No. 8,041,653, which is also incorporated herein by reference.

Volatility, Life and the Adaptive Power Problem

Volatility is a characteristic of life that distinguishes objects having it from those that do not, either because such functions have ceased, as in death, or else because they lack such functions, as is the case for inanimate objects. The fact that all life is volatile leads to the observation that life is adaptive at all scales: every component of every cell is being held together through constant repair. A closer look reveals that adaptation at such a massive scale appears to be fundamentally at odds with a non-volatile computing framework.

Consider two switches. The first switch is volatile, so that its state must constantly be refreshed or repaired. The second switch is non-volatile, impervious to background energy fluctuations. Let's take a look at what it takes to change the state of each of these switches, which is the most fundamental act of adaptation or reconfiguration. Abstractly we can represent a switch as a potential energy well with two or more minima, as shown in FIG. 1, which illustrates a graph 100 depicting a MSS (Meta-stable Switch), in accordance with an aspect of the disclosed embodiments. A MSS is a two-state element that switches probabilistically between its two states as a function of applied bias and temperature. The probability that the MSS will transition from the B state to the A state is given by $P_A P_A$, while the probability that the MSS will transition from the A state to the B state is given by $P_B$. We model a memristor as a collection of N meta-stable switches evolving over discrete time steps.

In the non-volatile case, we must apply energy sufficient to overcome the barrier potential and we dissipate energy in proportion to the barrier height once a switching takes place. Rather than just the switch, it is the electrode leading to the switch that must be raised to the switch barrier energy. As the number of adaptive variables increases, the power required sustaining the switching events scales as the total distance needed to communicate the switching events. The worst possible architecture is thus a centralized CPU coupled to a distributed non-volatile memory.

In the volatile case we can do something more interesting. Rather then apply energy, we can take it away. As the switch dissipates less energy its barriers fall until the energy inherent in thermal fluctuations are sufficient to cause spontaneous state transitions. Provided that a mechanism exists to gate the energy access of the volatile memory element contingent on it satisfying external constraints, the memory element will configure itself should energy return once constraints are met.

In the non-volatile case the energy needed to effect a state transition originates from outside the switch and must be communicated. In the volatile case, the energy to effect a state transition came from the switch itself. One switch was programmed while the other programmed itself. One switch requires more energy to transition and the other requires less energy. When we combine these observations with the fact that all brains (and life) are inherently volatile we are left with the interesting notion that volatility may actually be a solution to Moore's second law rather than a cause of it. Perhaps the only thing that must change is how we think about computing Meta-Stable Switches A meta-stable switch (MSS) possesses two states, A and B, separated by a potential energy barrier. Let the barrier potential be the reference potential V=0. The probability that the MSS will transition from the B state to the A state is given by $P_A$, while the probability that the MSS will transition from the A state to the B state is given by $P_B$. Transition probabilities can be modeled as:

$$P_A = \alpha \frac{1}{1 + e^{-\beta(\Delta V - V_A)}} = \alpha \Gamma(\Delta V, V_A) \quad (1)$$

$$P_B = \alpha(1 - \Gamma(\Delta V, -V_B)) \quad (2)$$

where $$\beta = \frac{q}{kT}$$

is the thermal voltage and is equal to 26 $mV_{-1}$ at T=300K, $$\alpha = \frac{\Delta t}{t_c}$$

is the ratio of the time step period $\Delta t$ to the characteristic time scale of the device, $t_c$, and $\Delta V$ is the voltage across the switch. We define $P_A$ as the positive-going direction, so that a positive applied voltage increases the chances of occupying the A state. Each state has an intrinsic electrical conductance given by $w_A$ and $w_B$. We take the convention that $w_B > w_A$. A MSS possesses utility in an electrical circuit as a memory or adaptive computational element so long as these conductances differ.

A memristor can be modeled as a collection of N meta-stable switches evolving in discrete time steps, $\Delta t$. The memristor conductance can be provided by the sum over each meta-stable switch:

$$W_m = N_A w_A + N_B w_B = N_B(w_B - w_A) + N w_A \quad (3)$$

where $N_A$ is the number of MSSs in the A state, $N_B$ is the number of MSSs in the B state and $N = N_A + N_B$. At each time step some sub-population of the MSSs in the A state will transition to the B state, while some sub-population in the B state will transition to the A state. The probability that k switches will transition out of a population of n switches is given by the binomial distribution:

$$P(n, k) = \frac{n!}{k!(n-1)!} p^k (1-p)^{n-k} \quad (4)$$

As n becomes large, the binomial distribution can be approximated with a normal distribution:

$$G(\mu, \sigma^2) = \frac{e^{\frac{-(x-\mu)^2}{2\sigma^2}}}{\sqrt{2\pi\sigma^2}} \quad (5)$$

where $\mu=np$ and $\sigma^2=np(1-p)$.

The change in conductance of a memristor can be modeled as a probabilistic process where the number of MSSs that transition between A and B states is picked from a normal distribution with a center at np and variance np(1−p), and where the state transition probabilities are given by Equation 1 and Equation 2.

The update to the memristor conductance can be provided by the contribution from two random variables picked from two normal distributions:

$$\Delta N_B = G(N_A P_A, N_A P_A (1-P_A)) - G(N_B P_B, N_B P_B (1-P_B)) \quad (6)$$

The final update to the conductance of the memristor is then given by:

$$\Delta w_m = \Delta N_B (w_B - w_A) \quad (7)$$

The Memristor

In 2008, HP Laboratories announced the production of the fourth and final elemental two-terminal electronic device, the memristor, which Chua postulated the existence of in 1971. It can be argued that physical devices are not purely memristive, but for the sake of simplicity we refer to a memristor as a device that can be switched between high and low resistance states and usually exhibits a pinched hysteresis loop when plotting the current flowing through the device as a function of an applied sinusoidal voltage. For learning neuromorphic circuits we are most interested in devices that exhibit a gradual state transition rather than an abrupt switching-like behavior. For this reason, we chose two memristor devices to test our MSS model against: the Ag-Chalcogenide device from Boise State University and the Ag—Si device from the University of Michigan.

Figure 2A:
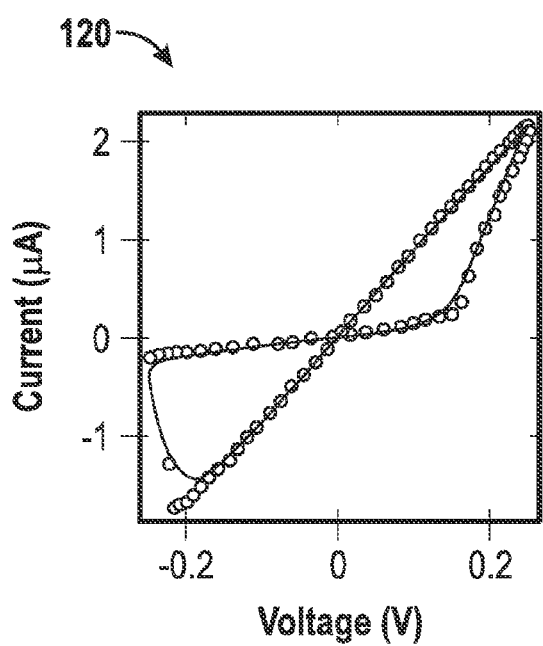
FIG. 2 illustrates graphs depicting model-to-hardware correlation using a MSS model, in accordance with the disclosed embodiments.
Figure 2B:
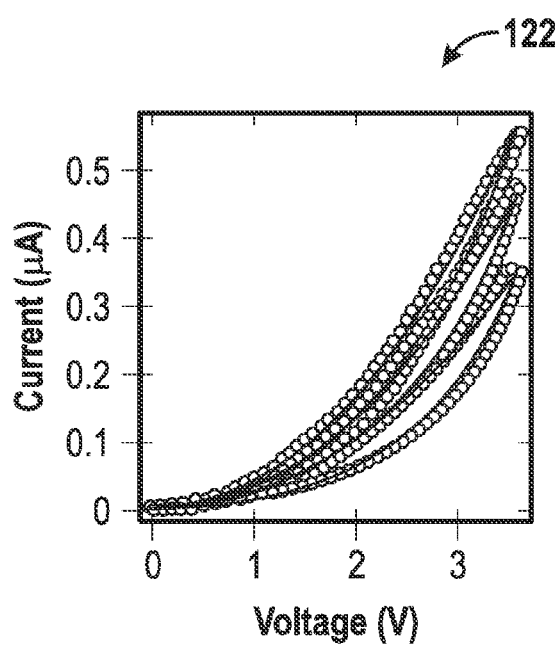

FIG. 2 illustrates graphs 120, 122 depicting model-to-hardware correlation using a MSS model, in accordance with aspects of the disclosed embodiments. Solid lines shown in graphs 120, 122 of FIG. 2 represent device simulations overlaid on top of real device current-voltage data. A) The Ag-Chalcogenide device from Boise State University, for example, was driven with a sinusoidal voltage of 0.25 V amplitude at 100 Hz. B) The Ag—Si device from the University of Michigan, for example, was driven with a triangle wave with amplitude of 1.8 V, DC offset of 1.8 V and frequency of 0.5 Hz.

FIG. 2 illustrates the correlation between our MSS model and the two devices. To account for the non-linearity in the hysteresis loops in the Ag—Si device, we extended the MSS model to include a dynamic conductance of the A and B states. Instead of the conductance being constant for both states, it is a function of the voltage; that is, it displays diode-like properties. To give the conductance a non-linear behavior, we replace $w_A$ and $w_B$ in Equation 7 with a second-order polynomial function:

$$w = a + bV + cV^2 \quad (8)$$

where V is the instantaneous voltage across the device and the parameters a, b, and c are adjusted to fit the model to the hardware data.

Differential Memristor Synapse

Figure 3:
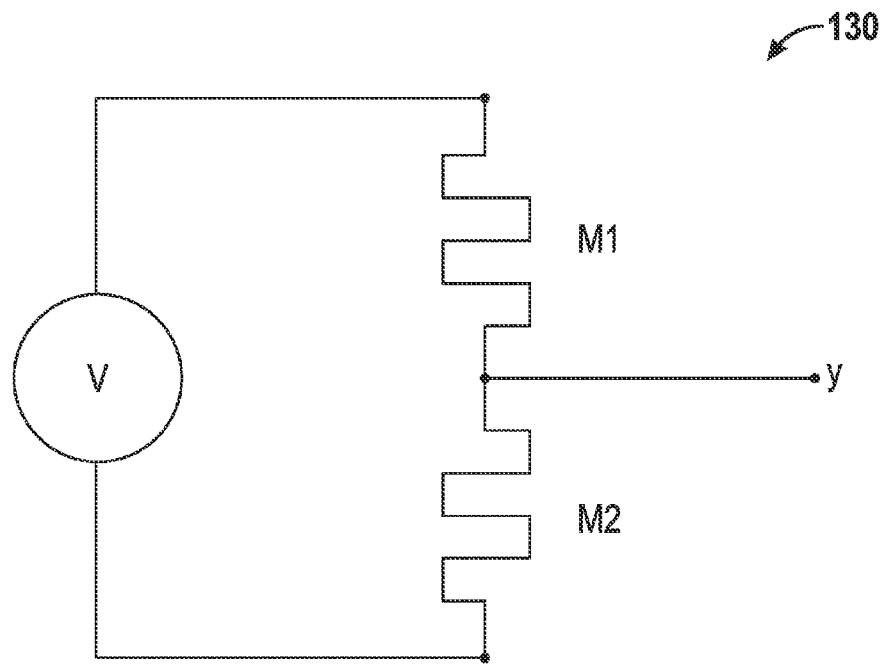
FIG. 3 illustrates a schematic diagram depicting a differential pair of memristors forming a synapse, in accordance with aspects of the disclosed embodiments.

While most neuromorphic computing research has focused on exploiting the synapse-like behavior of a single memristor, we have found it much more useful to implement synaptic weights via a differential pair of memristors. First, a differential pair provides auto-calibration making the synapse impervious to device inhomogeneities. Second, most machine learning models that incorporate synaptic weights treat a weight as possessing both a sign and a magnitude. A solitary memristor cannot achieve this. A synapse formed from a differential pair of memristors is shown in FIG. 3, which illustrates a schematic diagram 130 depicting a differential pair of memristors M1 and M2 forming a synapse, in accordance with aspects of the disclosed embodiments.

Typically, synapses are represented by single memristors. We use, however, a differential pair of memristors as this allows for the synapse to possess both a sign and magnitude. M1 and M2 form a voltage divider causing the voltage at y to be some fraction of V. The memristor pair auto balances itself in the ground state preventing issues arising from device inhomogeneities.

Read Phase—Anti-Hebbian

The application of a read voltage V will damage the synaptic state. For example, if the conductance of M1 is larger than M2, the output voltage y will be larger than V/2. During the application of voltage V, memristor M1 has a smaller voltage drop across it than M2. This causes the conductance of M2 to increase more than the conductance of M1, bringing the output y closer to V/2. We say that this change in the synaptic state is anti-Hebbian because the change of the synaptic weight will occur in such a direction as to prevent the next read operation from evaluating to the same state, which is exactly opposite of Hebbian learning. Seen in another light, the synapse will converge to a random binary number generator in the absence of reinforcement feedback. Notice that this negative feedback is purely passive and inherently volatile. The act of reading the state damages the state by bringing it closer to thermodynamic equilibrium. This property is of great use as discussed below.

Write Phase—Hebbian

To undue the damage done via the act of reading of the state, we may (but need not) apply a "rewarding" feedback to the "winner" memristor. For example, if y>V/2 during the read phase, we may set y=0 for a period of time. This increases the conductance of M1 while keeping the conductance M2 constant. We say that this change in the synaptic state is Hebbian, since it reinforces the synaptic state. The longer the feedback is applied, the more the synaptic weight is strengthened. Although we can modularize this feedback, for our purposes here we may think of this update as occurring in a discrete "all or nothing" quantity.

Decay Phase—Normalize

During the read and write phases, the memristors are increasing in conductance. At some point they will saturate in their maximally conductive states, the synaptic differential will go to zero and the synapse will become useless. To prevent saturation we must apply the same reverse potential across both memristors for a period of time. This procedure decreases the conductance of both memristors in proportion to its starting value, preventing saturation while preserving the synaptic state. Note that this operation could also occur via natural decay via a prolonged "sleep period". We have found, however, that the ability to force this decay is advantageous as it both prevents the need for prolonged rest periods and also removes a coupling between the natural decay rate and the time scale of processing. It is worth noting, however, that the most power-efficient configuration is one where the accumulation of conductance due to the read and write phases is balanced via a natural decay rate.

The AHaH Rule

Anti-Hebbian and Hebbian (AHaH) plasticity can be achieved through a two-phase process: read and write. The decay phase is just a practical necessity to keep the memristors out of their saturation states. Factoring out the decay operation, a simple functional model of the read and write update can be written as:

$$\Delta w_i = \alpha \text{sign}(s) - \beta y + \eta \quad (9)$$

where s is a supervisory signal, $\alpha$ and $\beta$ are constants, $\eta$ is thermodynamic noise, $w_i$ is the $i^{th}$ spiking synapse, and y is the AHaH Node's synaptic activation written as:

$$y = \sum_i w_i + b \quad (10)$$

where b is a "node bias". The node bias can be thought of as an input that is always active but which never receives a Hebbian update:

$$\Delta b = -\beta y \quad (11)$$

A node bias can be seen as the subtraction of an average activation. Its function is to facilitate the AHaH Node in finding balanced attractor states and avoid the null state (described later).

The supervisory signal s may come from an external source or it may be the AHaH Node's post-synaptic activation, i.e. s=y. In the later case the node is purely unsupervised and reduces to:

$$\Delta w_i = \alpha \text{sign}(y) - \beta y + \eta \quad (12)$$

Circuit Realization

Figure 4:
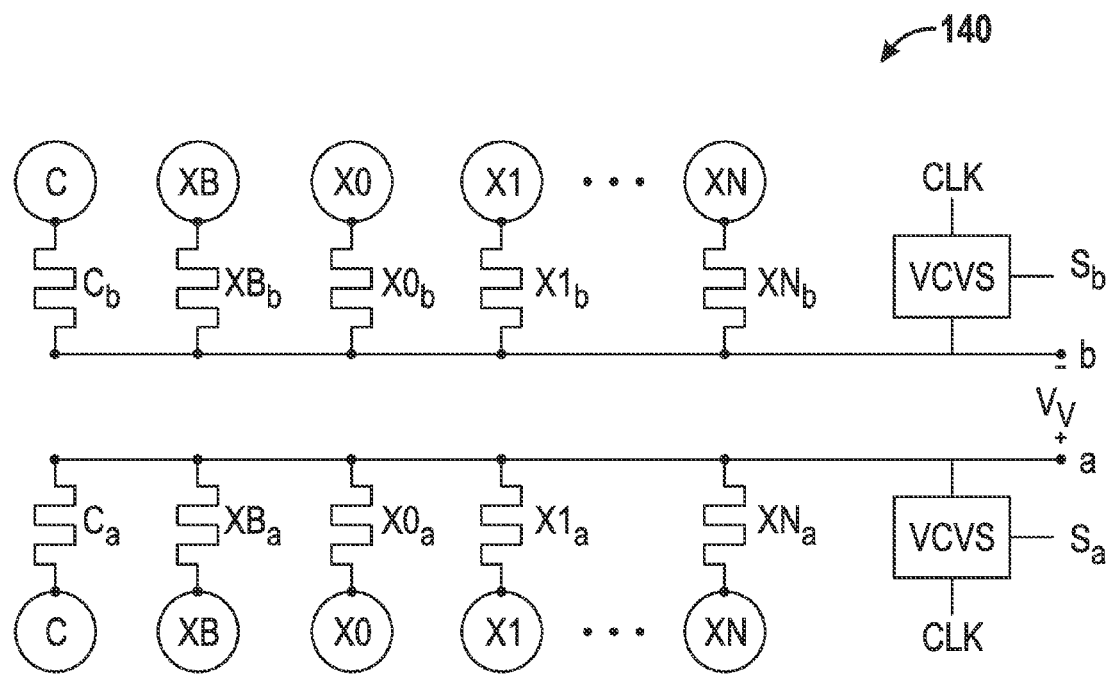
FIG. 4 illustrates a circuit schematic diagram depicting an AHaH node, in accordance with a preferred embodiment.

The AHaH Node described above can be implemented with the circuit 140 shown in FIG. 4, which Illustrates an AHaH node, in accordance with a preferred embodiment. That is, circuit 140 can be implemented as an AHaH node and in the context of, for example, a MNP (Memristive Neural Processor). During a single AHaH cycle, a binary signal of length N on the inputs X0 through XN produces a continuous-value signal on the output at $V_y = V_a - V_b$. $V_y$ can be furthermore "digitized" with a voltage comparator (not shown) resulting in a single-bit binary output. Electrode C is grounded during read operations and forms a voltage divider with active $X_i$ inputs and node bias input XB. The signals $S_a$ and $S_b$ are used to modulate and control supervised or unsupervised learning.

The configuration shown in FIG. 4 includes two "half-nodes" with output voltages $V_a$ and $V_b$. Electrode C is grounded during read operations and forms a voltage divider with active X inputs and node bias input XB. Without Hebbian feedback, $V_a$ and $V_b$ will tend toward Vdd/2. XB is a node bias input and is always active (Vdd) during the read phase but never receives a Hebbian update. Inputs X0 through XN are set to Vdd if active and left floating otherwise. Although FIG. 4 illustrates one possible AHAH node arrangement, it should be noted that other AHaH Node configurations are also possible and are not limited to the particular configuration shown in FIG. 4.

A voltage controlled voltage source (VCVS) can be employed to modulate Hebbian feedback during the write phase. Either electrode a or b is grounded during application of Hebbian feedback, determined by either an external signal S (supervised) or the differential voltage across electrodes a and b (unsupervised). Decay is accomplished by raising the voltage on electrodes a and b to Vdd while grounding active inputs as well as electrodes C and XB. C and XB are left floating during the write phase. The output of the AHaH Node is $V_y = V_a - V_b$, and this output can be digitized to either a logical 1 or a 0 with a voltage comparator (not shown). The "big picture" is that during a single AHaH cycle a binary input of length N with k driven inputs ("spikes") and N−k floating inputs is converted to logical 1or a 0 at the output.

Recall that the AHaH rule can be implemented via a three-phase process of read-write-decay. By changing the pulse duty cycles and relative durations of these phases, the shape of the AHaH rule can be changed (see FIG. 5). This corresponds to modification of the a and 13 parameters in Equation 12. This makes possible a single generic AHaH circuit that can be applied to almost any machine-learning problem.

In general, FIGS. 3-4 describe an AHAH node configuration or AHAH node apparatus for use in electronic circuits. Such an apparatus can include, for example, at least one meta-stable switch, and a differential pair of output electrodes, wherein each electrode among the differential pair of output electrodes comprises a plurality of input lines coupled thereto via the at least one meta-stable switch. The at least one meta-stable switch can comprise, in some examples, a two-state element that switches probabilistically between two states as a function of applied bias and temperature.

FIG. 5 illustrates a graph 150 depicting data indicative the AHaH rule generated from an AHaH node, in accordance with aspects of the disclosed embodiments. Solid lines in FIG. 5 represent the functional AHaH rule described by Equation 12. Squares represent the Hebbian feedback ($\Delta w$) applied given the sign and magnitude of y, the AHaH Node's output. The AHaH rule can be externally adjusted by tuning the duty cycle of the read and write phases. By being able to externally adjust the synaptic feedback in this way, circuits can be reused for several different machine-learning applications without the need for custom-built chips.

AHaH Attractor States as Logic Functions

FIG. 6 illustrates an input space diagram 152 and a graph 154 depicting attracting attractor states of a two-input AHaH node, in accordance with aspects of the disclosed embodiments. The AHaH rule naturally forms decision boundaries that maximize the margin between data distributions. This is easily visualized in two dimensions, but it is equally valid for any number of inputs. A) Input-space: attractor states are represented by decision boundaries A, B, and C. B) Weight-space: simulation results of a two-input AHaH Node with, for example, Ag-Chalcogenide memristors. Evolution of weights from a random normal initialization to attractor basins can be clearly seen from the data shown in FIG. 6.

Let us analyze the simplest possible AHaH Node: one with only two inputs. The four possible input patterns are:

$$[x_0, x_1] = [0,0], [0,1], [1,0], [1,1] \quad (13)$$

Stable synaptic states can occur when the sum over all weight updates is zero. In this simple case it is straightforward to derive the stable synaptic weights algebraically. However, we have found a geometric interpretation of the attractor states to be more conceptually helpful. We can plot the AHaH Node's stable decision boundary (solving for y=0) on the same plot with the data that produced it. This can be seen in the input space diagram 152, where we have labeled decision boundaries A, B and C. The AHaH rule can be seen as a local update rule that is attempting to "maximize the margin" between opposing data distributions. As the "positive" distribution pushes the decision boundary away from it (making the weights more positive), the magnitude of the positive updates decreases while the magnitude of the opposing negative updates increases. The net result is that strong attractor states exist when the decision boundary can cleanly separate a data distribution, and the output distribution of y becomes bi-modal.

Each decision boundary plotted in the input space diagram 152 represents a state and its anti-state, since two solutions exist for each stable decision boundary. Using our custom analog simulation engine MemSim (www.xeiam.com), we simulated a two-input AHaH Node with Ag-Chalcogenide memristors. In this example, 150 AHaH Nodes were simulated with randomly initialized synaptic weights and given a stream of 1000 inputs randomly chosen from the set {[1,0], [0,1], and [1,11]}. The AHaH Node fell into one of the six attractor basins shown in graph 154 of FIG. 6.

The attractor states A, B, and C can be viewed as logic functions. This can be seen in a sample truth table (Table 1 below). As an example, synaptic state (SS) A corresponds to logic function 8. Of interest is that logic functions 0-7 cannot be attained unless we add an input bias, which is an input that is always active and which receives a Hebbian update. This is a standard procedure in machine learning. Non-linear logic function 9 and 6 correspond to the "XOR" logic function and its compliment. The XOR function can be attained through a two-stage circuit.

We refer to the A state, and all higher-order generalization, as the null state. The null state occurs when an AHaH Node assigns the same weight value to each synapse and outputs a +1 or −1 for every pattern. The null state is useless computationally, and its occupation can be inhibited by the node bias.

The AHaH attractor states are computationally complete under two cases: 1) the inclusion of an input bias or 2) the use of an "extraction" logic gate or threshold such as a NAND gate. This result indicates that any algorithm can theoretically arise from a collective of AHaH Nodes occupying their attractor states. This has implications in large self-organizing circuits. Rather then having to expend energy overcoming a potential barrier to configure a non-volatile logic gate, a volatile logic gate formed from one or more AHaH Nodes can self-configure once Hebbian feedback is removed. Once a better solution found Hebbian feedback can be applied and the solution stabilized.

Adaptive Spike Encoding

Although the AHaH rule can be extended easily to real-valued inputs, communicating analog data representations in VLSI is difficult or impractical. For this reason, combined with the observation that biology has settled on a sparse spiking representation, our methods require a conversion of input data into a sparse spiking representation. This representation requires that activity patterns be represented by a small set of active inputs out of a much larger set of potential inputs. A simple recursive method for producing such an encoding can be realized through strictly anti-Hebbian learning via a binary decision tree. The core AHaH Node circuitry can be used to do this encoding.

Starting from the root node and proceeding to the leaf node, the input x is summed with the node bias b, y=x+b. Depending on the sign of the result y, it is routed in one direction or another toward the leaf node. The node bias is updated according to anti-Hebbian learning, the practical result being a subtraction of an adaptive average:

$$\Delta b = -\beta y + \eta \qquad (14)$$

The IDs of nodes from root to leaf can then be used as a sparse spike code. Note that the root node becomes an input bias, while each addition level of bifurcation becomes a finer-grained adaptive bin. This process is an adaptive analog to digital conversion. Note that Equation 14 can be attained from Equation 9 by setting $\alpha=0$ $\alpha=0$. This adaptive binning procedure can be easily extended to sparse-spike encoded patterns if:

$$y = \sum_i w_i + b \qquad (15)$$

where $w_i$ is picked from a random distribution with zero mean.

AHaH Clusterer

Clustering is a method of knowledge discovery, which automatically tries to find hidden structure in data in an unsupervised manner. Centroid based clustering methods like k-means require that the user define the number of cluster centers ahead of time. Density-based methods can be used without pre-defining cluster centers, but can fail if the clusters are of various densities. Methods like OPTICS attempt to address some of the problems of variable densities, but introduce the problem that they expect some kind of density drop, leading to arbitrary cluster borders. On datasets consisting of a mixture of known cluster distributions, density-based clustering algorithms are out-performed by distribution-based method such as EM clustering. However, EM clustering assumes that the data is a mixture of a known distribution and as such is not able to model density-based clusters. It is furthermore prone to over-fitting.

An AHaH Node converges to attractor states that cleanly partition its input space my maximizing the margin between opposing data distributions. The set of AHaH attractor states are furthermore computationally complete. These two properties enable a collective of AHaH Nodes to assign unique labels to unique input data distributions. If a collective of

TABLE 1

Attractor states as logic functions
Each synaptic state (SS) corresponds to a logic function (LF) for each input pattern [$X_0$, $X_1$].

| | SS | | | | | | | | | | | | | | | |
|---|---|---|---|---|---|---|---|---|---|---|---|---|---|---|---|---|
| | A' | | | | B' | C' | | | | | C | B | | | | A |
| LF | 0 | 1 | 2 | 3 | 4 | 5 | 6 | 7 | 8 | 9 | 10 | 11 | 12 | 13 | 14 | 15 |
| $X_0, X_1 = 0, 0$ | 1 | 1 | 1 | 1 | 1 | 1 | 1 | 1 | 0 | 0 | 0 | 0 | 0 | 0 | 0 | 0 |
| $X_0, X_1 = 0, 1$ | 1 | 1 | 1 | 1 | 0 | 0 | 0 | 0 | 1 | 1 | 1 | 1 | 0 | 0 | 0 | 0 |
| $X_0, X_1 = 1, 0$ | 1 | 1 | 0 | 0 | 1 | 1 | 0 | 0 | 1 | 1 | 0 | 0 | 1 | 1 | 0 | 0 |
| $X_0, X_1 = 1, 1$ | 1 | 0 | 1 | 0 | 1 | 0 | 1 | 0 | 1 | 0 | 1 | 0 | 1 | 0 | 1 | 0 |

AHaH Nodes are allowed to randomly fall into attractor states, the binary output vector from the collective serves as a label for the input feature. We call such a collective an AHaH clusterer.

Vergence

We have developed a quantitative metric to characterize the performance of our AHaH clusterer. Given a unique feature F we would ideally like a unique label L (F→L). This is complicated by the presence of noise, occlusion, and non-stationary data or drift. Failure can occur in two ways. First, if the same underlying pattern is given more than one label, we may say that the AHaH clusterer is diverging. We measure the divergence, D, as the inverse of the average labels per pattern. Second, if two different patterns are given the same label, we may say that it is converging. We measure convergence, C, as the inverse of the average patterns per label.

Divergence and convergence may be combined to form a composite measure we call vergence, V.

$$V = \frac{D+C}{2} \quad (16)$$

Perfect cluster extraction will occur with a vergence value of 1.

Collective Partition Probability

The total number of possible output labels from the AHaH collective is $2^N$, where N is the number of AHaH Nodes in the collective. The collective may output the same label for different features if N is small and/or the number of patterns, F, is high. However, as the number of AHaH Nodes increases, the probability of this occurring drops exponentially. Under the assumption that all attractor states are equally likely, the odds that any two features will be assigned the same binary label goes as:

$$P = \frac{1}{2^N} + \frac{2}{2^N} + \ldots + \frac{F}{2^N} = \frac{F^2 + F}{2^{N+1}} \quad (17)$$

For example, given 64 features and 16 AHaH Nodes, the probability of two AHaH Nodes being assigned the same label is 3% and by increasing N to 32 this falls to less than one in a million. Using the above rule, an optimal number of AHaH Nodes for a given application can be determined.

Clusterer Results

To test the AHaH clusterer's performance as measured by our vergence metric, a random synthetic data set consisting of spike-encoded features was generated. To study the influence of the node bias we modulated its learning rate independently and set it to γ, while we set λ=α=β λ=α=β.

$$\Delta w_i = \lambda(\text{sign}(y) - y) + \eta$$

$$\Delta b = -\gamma y \quad (18)$$

when γ is too small the node bias cannot prevent the AHaH Nodes from falling into the null state. As more and more nodes fall into the null state, the AHaH clusterer starts to assign the same label to each pattern, resulting in a drop in convergence. One the other hand, increasing γ too high causes a decrease in the divergence. The node bias is forcing each AHaH Node to select an attractor state that bifurcates its space. Not all attractor states equally bifurcate the space, however. If γ is not too high it allows these asymmetrical states, leading to near-optimal partitioning. However, as λ is increased, the influence of the node bias skews the decision boundary away from an optimal partition. The result is higher divergence.

We independently swept several parameters to investigate the robustness of the AHaH clusterer. Table 2 below summarizes these results.

TABLE 2

AHaH clusterer sweep results.
(While sweeping each parameter and holding the others constant at their default values, the reported range is where the vergence remained greater than 90%.)

|  | Bias learning rate | Learning rate | AHaH Modes | Noise bits | Feature length | Number of features |
|---|---|---|---|---|---|---|
| Range | 0.04-0.24 | .0014-.027 | >7 | <48 | <86 | <300 |

The number of patterns that can be distinguished by the AHaH clusterer before vergence falls is a function of the pattern sparsity and pattern noise. Noise is generated by taking random input lines and activating them or, if the input line is already active, deactivating it. For a sparsity of 3% ($32/1024$) and for 6% noise (2 noise spikes per 32 spikes of pattern), the AHaH clusterer can distinguish 230 32-spike patterns before the vergence falls below 95%.

The performance of the AHaH clusterer is robust to noise. For example, we can achieve perfect performance up until 30% noise under a 100% pattern load (32 32-spike patterns).

Using MemSim, we performed circuit simulations of an AHaH clusterer formed of 10 AHaH Nodes, 16 inputs and N 4-bit patterns. Our results show the expected vergence decrease as the number of spike patterns increase, and circuit simulations show congruence with functional simulations as shown in FIG. 7.

Figure 7:
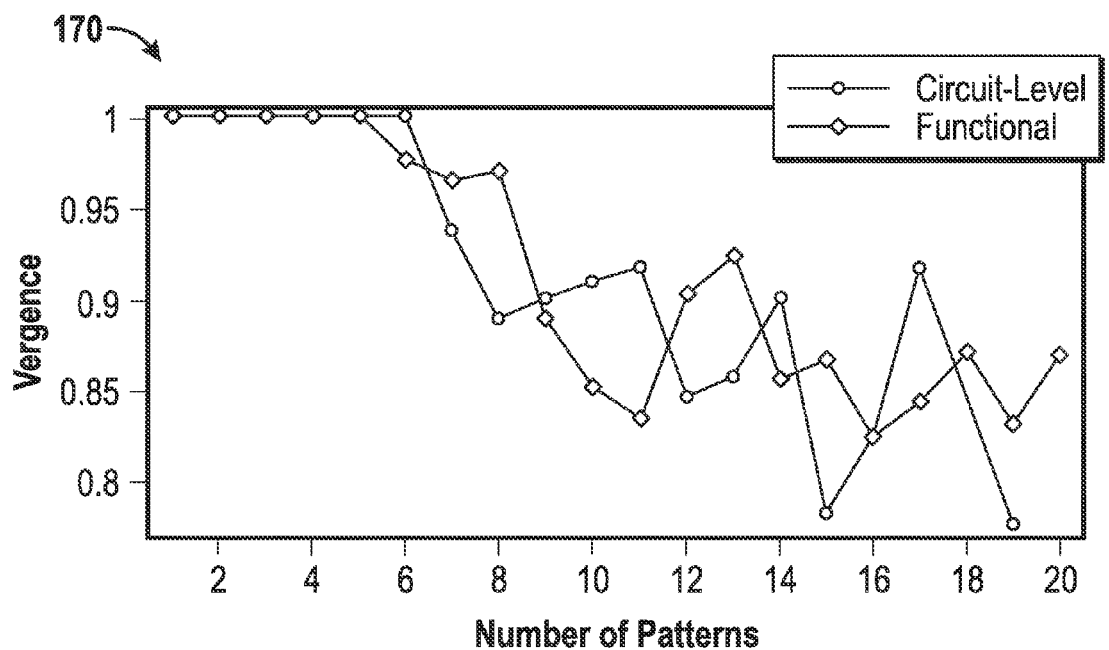
FIG. 7 illustrates a graph depicting data indicative of an AHAH clusterer including example circuit-level and function simulations, in accordance with aspects of the disclosed embodiments.

FIG. 7 illustrates a graph 170 depicting data indicative of an AHAH clusterer including example circuit-level and function simulations, in accordance with aspects of the disclosed embodiments. Graph 170 of FIG. 7 depicts circuit-level and functional simulation results of an AHaH clusterer formed of six AHaH Nodes and 16 input lines. The number of unique features of length 4-bits was swept from 1 to 20 and the vergence was measured. These results demonstrate congruence between our high-level functional model of the AHaH clusterer and the hardware implementation using memristors.

When paired with a sparse spike encoder, the AHaH clusterer appears to perform well across a spectrum of cluster types. To demonstrate this we took various two-dimensional cluster distributions and fed them into a k-nearest neighbor algorithm that we used as a sparse encoder. The IDs of the best matching 32 centers of a total 512 centers was fed into the AHaH clusterer, which assigned unique labels to the inputs. Each unique label can be mapped to a unique color or other representation. As can be seen in graphs 180, 182, 184 of FIG. 8, this method performs well for clusters of various sizes and numbers as well as non-Gaussian clusters. Videos of the clustering tasks shown in FIG. 8 can be viewed in an online Supporting Information section (Videos S1-S4).

Figures 8A, 8B, 8C:
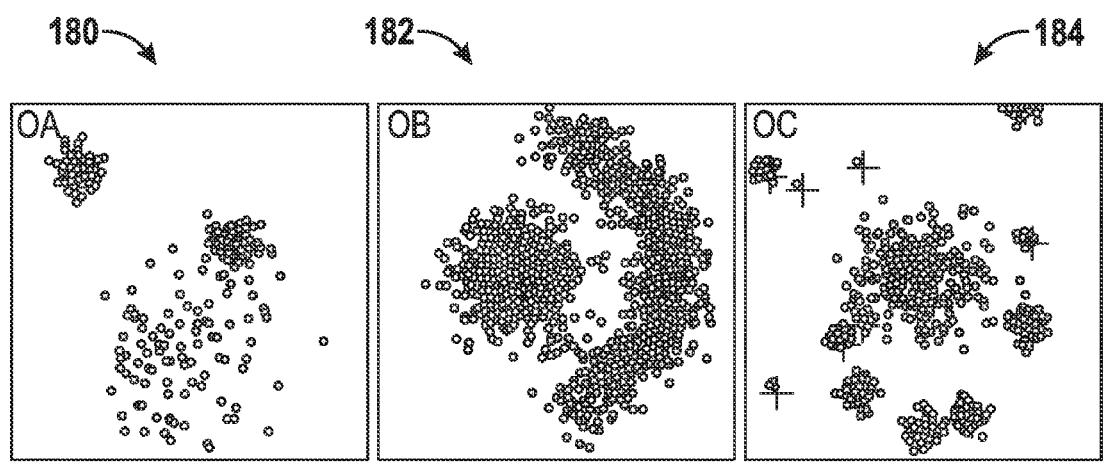
FIG. 8 illustrates graphs indicative of two-dimensional spatial clustering demonstrations, in accordance with aspects of the disclosed embodiments.

In general, FIG. 8 illustrates graphs 180, 182, 184 indicative of two-dimensional spatial clustering demonstrations, in accordance with aspects of the disclosed embodiments. FIG. 8 demonstrates that the AHaH clusterer of the disclosed embodiments performs well across a wide range of different 2-D spatial cluster types, all without pre-defining the number of clusters or the expected cluster types. A) Gaussian B) non-Gaussian C) random Gaussian size and placement AHaH Classifier Linear classification is a tool used in the field of machine learning to characterize and apply labels to objects. State of the art approaches to classification include algorithms such as Logistic Regression, Decision Trees, Support Vector Machines (SVM) and Naïve Bayes and are used in real-world applications such as image recognition, data mining, spam filtering, voice recognition, and fraud detection. Our AHaH-based linear classifier is different from these techniques mainly in that it is not just another algorithm; it can be realized as a physically adaptive circuit. This presents several competitive advantages; the main one being that such a device would increase the speed and reduce power consumption dramatically while eliminating the problems associated with disk I/O bottlenecks experienced in large-scale data mining applications.

The AHaH Classifier can include a number of AHaH Nodes, each assigned to a classification label and each operating the supervised form of the AHaH rule of Equation 9. In cases where a supervisory signal is not available, the unsupervised form of the rule (Equation 12) may be used. Higher node activations (y) are interpreted as a higher confidence. There are multiple ways to interpret the output of the classifier depending on the situation. First, one can order all node activations and choose the most positive. This method is ideal when only one label per pattern is needed and an output must always be generated. Second, one can choose all labels that exceed an activation value threshold. This method can be used when multiple labels exist for each input pattern. Finally, only the most positive is chosen if it exceeds a threshold, otherwise nothing is returned. This method can be used when only one label per pattern is needed, but rejection of a pattern is allowed.

All inputs can be converted into a sparse spiking representation. Continuous valued inputs were converted using the adaptive binning method of Equation 14. Text was converted to a bag-of-words representation where each word was representative of a spike. Image patches for the MNIST handwritten character dataset were converted to a spike representation using the method of Equation 15, where the index of raw pixel values was used as a spike input. Each image was then converted to a spike representation via a standard convolution+pooling approach with an image patch of size 8×8 and pooling size of 8×8 pixels.

To compare the AHaH classifier to other state of the art classification algorithms, we chose four popular classifier benchmark data sets: the Breast Cancer Wisconsin, Census Income, MNIST Handwritten Digits, and the Reuters-21578 data sets, representing a diverse range of challenges. Our benchmark results are shown in Table 3 along with results from other published studies using their respective classification methods. Our scores shown in Table 3 are for the peak F1 scores produced by our classifier.

Figure 9:
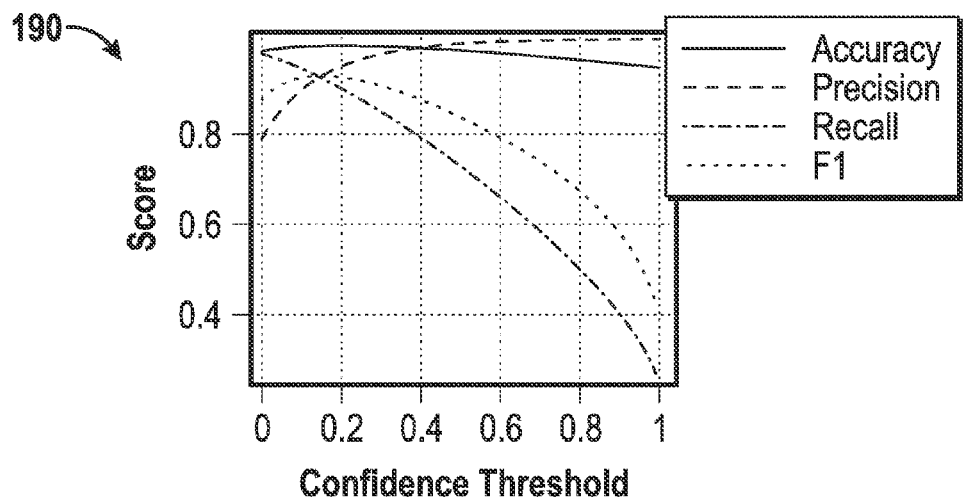
FIG. 9 illustrates a graph depicting example test classification benchmark results, in accordance with aspects of the disclosed embodiments.

Typical for all benchmark data sets, as the confidence threshold is increased, the precision increases while recall drops as can be seen in FIG. 9, which illustrates a graph 190 depicting example test classification benchmark results, in accordance with aspects of the disclosed embodiments. FIG. 9 generally illustrates Reuters-21578 text classification benchmark results. Using the top ten most frequent labels associated with the news articles in the Reuters-21578 data set, the AHaH classifier's accuracy, precision, recall, and F1 score was determined as a function of its confidence threshold. As the confidence threshold is increased, the precision increases while recall drops. An optimal confidence threshold can be chosen depending on the desired results, and it can even be dynamically changed.

TABLE 3

Benchmark classification results.
(AHaH classifier results are for peak F1 score on published test data sets and compare favorably with other methods.)

| Breast Cancer Wisconsin (Original) | | Census Income | | MNIST Handwritten Digits | | Reuters-21578 | |
|---|---|---|---|---|---|---|---|
| AHaH | .997 | AHaH | .86 | AHaH | .99 | AHaH | .92 |
| RS_SVM | 1.0 | Naïve-Bayes | .86 | Deep Convex Net | .992 | SVM | .92 |
| SVM | .972 | NBTree | .859 | Large Convolutional Net | .991 | Trees | .88 |
| C4.5 | 94.74 | C4.5 | .845 | Polynomial SVM | .986 | Naïve-Bayes | .82 |

The AHaH Classifier is also capable of unsupervised learning by evoking Equation 12. If no supervised labels are given but the classifier is able to output labels with high confidence, the output can be assumed to be correct and used as the supervised signal. The result is a continued convergence into the attractor basins, which represents a point of maximal margin. This has application in any domain where large volumes of unlabeled data exist, as in image recognition for example. By allowing the classifier to process these unlabeled examples, it can continue to improve. To demonstrate this capability we used the Reuters-21578 dataset. Results are shown in FIG. 10, which clearly shows continued improvement after supervised learning is shut off.

Figure 10:
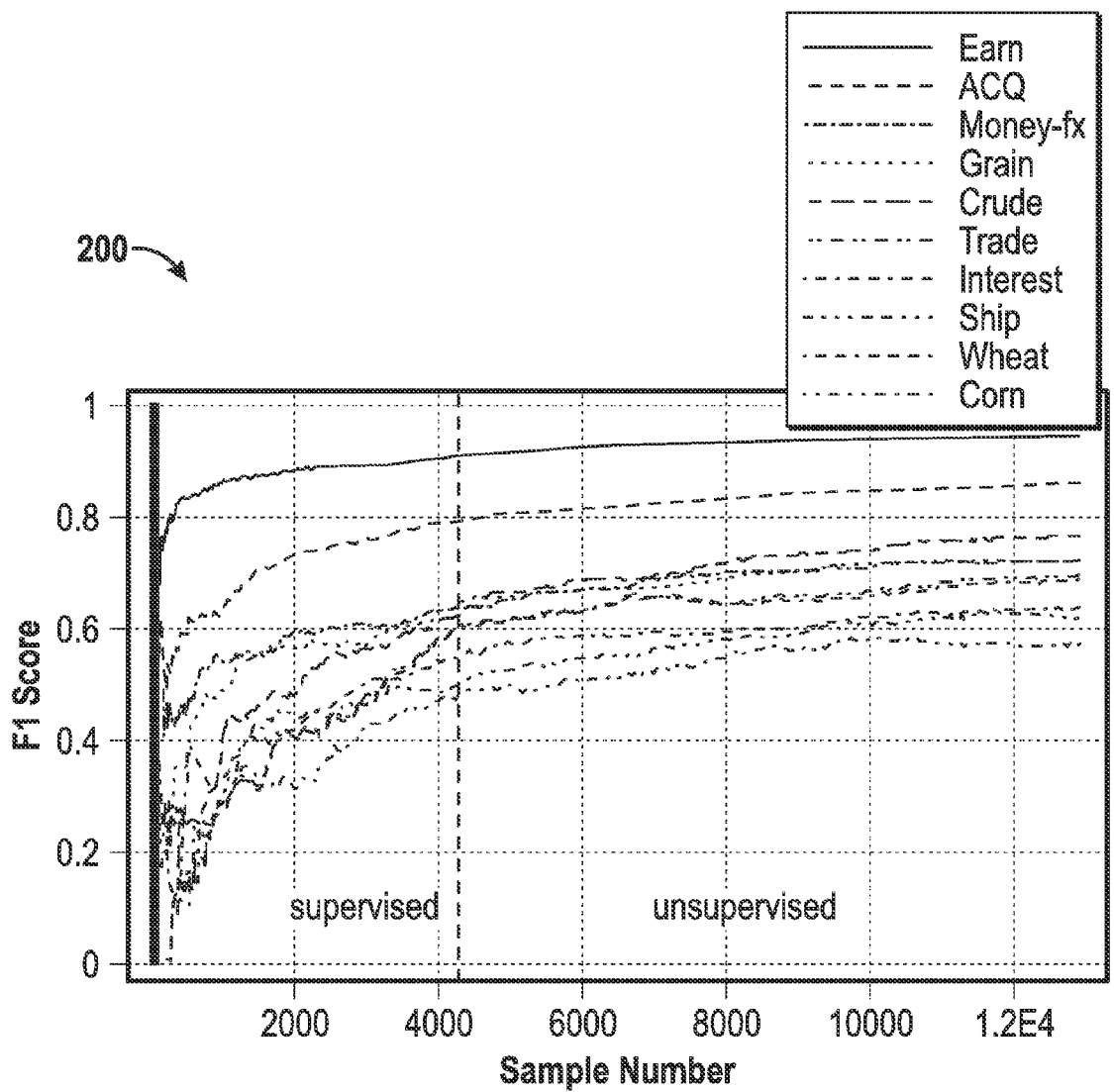
FIG. 10 illustrates a graph depicting data indicative of semi-supervised operation of an AHaH classifier, in accordance with aspects of the disclosed embodiments.

FIG. 10 illustrates a graph 200 depicting data indicative of semi-supervised operation of an AHaH classifier, in accordance with aspects of the disclosed embodiments. From T=0 to T=4257, the classifier was operated in a supervised mode via Equation 9. From T=4258 onward, the classifier was operated in an unsupervised mode via Equation 12. A confidence threshold of 0.95 was set for unsupervised application of Hebbian learning. These results demonstrate that the AHaH classifier is capable of continuously improving its performance without supervised feedback.

Our classification results compare well to published benchmarks and consistently match or exceed SVM performance. We find this surprising given the simplicity of the approach, which amounts to nothing more than a simple sparse spike encoding technique followed by classification with independent AHaH Nodes. The AHaH classifier displays a number of desirable properties. It appears to be an optimal incremental learner, it can handle multiple class labels, it is capable of unsupervised adaptation, it is tolerant of missing data, noise, and can handle mixed data types via sparse-spike encoding. We also have observed excellent tolerance to over-fitting.

Most of the benchmark datasets presented in Table 3 were too large for circuit simulation in MemSim at this time. However, the Wisconsin Breast Cancer dataset was sufficiently small enough to simulate at circuit level and compare to functional-level results. There were 183 test data points following 500 train data points. The circuit-level simulation yielded a classification rate of 98.9%, which compares favorably to the functional simulations.

Complex Signal Prediction

By posing signal prediction as a multi-label classification problem, we can learn complex temporal sequences. For each moment of time, we convert the real-valued signal S(t) into a sparse spiking representation F(S(t)) F(S(t−N)) using the method of Equation 14. We temporally buffer these features to form a feature set:

$$[F(S(t-N)), F(S(t-N+1)), \ldots, F(S(t-1))] \quad (19)$$

We may now use this feature set to make predictions of the current feature activations F(S(t)), where the classifier is assigning a unique label to each spike. After learning, the output prediction may be used in lieu of the actual input and run forward recursively in time. In this way extended predictions about the future are possible. An example can be seen in FIG. 11.

FIG. 11 illustrates a graph 300 depicting complex signal prediction with an AHaH classifier, in accordance with aspects of the disclosed embodiments. By posing prediction as a multi-label classification problem, the AHaH classifier can learn complex temporal waveforms and make extended predictions via recursion.

AHaH Motor Controller

FIG. 12 illustrates a diagram 400 of an unsupervised robotic arm challenge and a graph 402 depicting data thereof, in accordance with aspects of the disclosed embodiments. The robotic arm challenge (see diagram 400 of FIG. 12) involves a multi-jointed robotic arm that moves to capture a target. Using only a value signal from the robot's "eyes" and a small collection of AHaH Nodes in a closed-loop configuration, the robotic arm captures stationary and moving targets. The average total joint actuation required to capture the target remains constant as the number of arm joints increased for AHaH-guided actuation is indicated by graph 402. For random actuation, the required actuation grows exponentially.

Stabilizing Hebbian feedback during the write phase of the AHaH cycle may occur anytime after the read operation. This opens the possibility of using it for reinforcement-based learning. Here we show that a small collective of AHaH Nodes can be used to guide a multi-jointed robotic arm to a target based on a value signal.

We created a robotic arm virtual environment in which a collection of AHaH Nodes controls the angles of N connected fixed length rods in order to make contact with a target (see diagram 400). The arm shown in diagram 400 rests on a plane with its base anchored at the center, and all the joints have 360 degrees of freedom to rotate. New targets are dropped randomly within the robotic arm's reach radius after it captures a target. The robotic arm virtual environment is part of an open-source project called Proprioceptron (www.xeiam.com).

We measured the arms efficiency in catching targets by summing the total number of minimal incremental joint actuations from the time the target was placed until capture. The performance was compared with a random actuator as the number of joints was increased. Results are shown in graph 402 of FIG. 12.

Sensors can measure the relative joint angles of each segment of the robot arm as well as the distance from the target ball to each of two "eyes" located on the side of the arm's "head". Sensor measurements are converted into a sparse spiking representation using the method of Equation 14. A value signal can be computed as the inverse distance of the head to the target:

$$V = 1/1 + d \quad (20)$$

Opposing "muscles" actuate each joint. Each muscle is formed of many "fibers", and a single AHaH Node controls each fiber. The number of incremental steps each joint is moved, ΔJ, is given by:

$$\Delta J = \sum_{i=0}^{numFibers} H(y_i^0) - H(y_i^1) \quad (21)$$

where y hd $i^0$ is the post-synaptic activation of the $i^{th}$ AHaH Node controlling the $i^{th}$ muscle fiber of the primary muscle, and $y_i^1$ is the post-synaptic activation of the $i^{th}$ AHaH Node controlling the $i^{th}$ muscle fiber of the opposing muscle, and H(y) is the Heaviside step function. The number of incremental steps moved in each time step is then given by the difference in these two values.

We explored multiple methods for giving rewarding Hebbian feedback to the AHaH Nodes. The most efficient method took into account the state of each muscle relative to the muscle group to specifically determine if feedback should be given. Given a movement we can say if a fiber acted for or against the movement. If we know that the movement increased or decreased the value at a later time, we can determine specifically if each AHaH Node should receive Hebbian feedback. For example, if the fiber acted in support of a movement and the value later dropped then we can say the fiber made a mistake and deny it the Hebbian update. Experimental observation led to constant values of α=0.1 and β=0.5, although generally good performance was observed for a wide range of values.

Our results appear to demonstrate that the collective of AHaH Nodes are performing a gradient descent of the value function and can rapidly guide the arm to its target.

AHaH Combinatorial Optimizer

An AHaH Node will descend into a probabilistic output state if the Hebbian feedback is withheld. As the magnitude of the synaptic weight falls closer to zero, the chance that thermodynamic state transitions will occur rises from ~0% to 50%. This property can be exploited in probabilistic search and optimization tasks. Consider a combinatorial optimization task such as the traveling salesman problem where we have encoded the city path as a binary vector $P=[b_0, b_1, \ldots, b_n]$. The space of all possible paths can be visualized as the leaves of a binary tree of depth N. The act of constructing a path can be seen as a routing procedure traversing the tree from trunk to leaf. By allowing prior attempted solutions to modify the routing probabilities, an initial uniform routing distribution can collapse into a sub-space of more optimal solutions.

This can be accomplished by utilizing an AHaH Node with a single input as the nodes within a virtual routing tree. As a route progresses from the trunk to a leaf, each AHaH Node is evaluated for its state and receives the anti-Hebbian update.

Should the route result in a solution that is better than the average solution, all nodes along the routing path receive a Hebbian update. By repeating the procedure over and over again, a positive feedback loop is created such that more optimal routes result in higher route probabilities that, in turn, result in more optimal routes. The net effect is a collapse of the route probabilities from the trunk to the leaves as a path is locked in. The process is intuitively similar to the formation of a lighting strike searching for a path to ground and as such we call it a "strike".

To evaluate a strike as a method of combinatorial optimization, we constructed a recursive fractal tree of AHaH Nodes and set in Equation 9. The noise variable, η, was picked from a random Gaussian distribution with zero mean and 0.025 variance. After every 10,000 solution attempts, branches with synaptic weight magnitudes less than 0.01 were pruned.

Figure 13A:
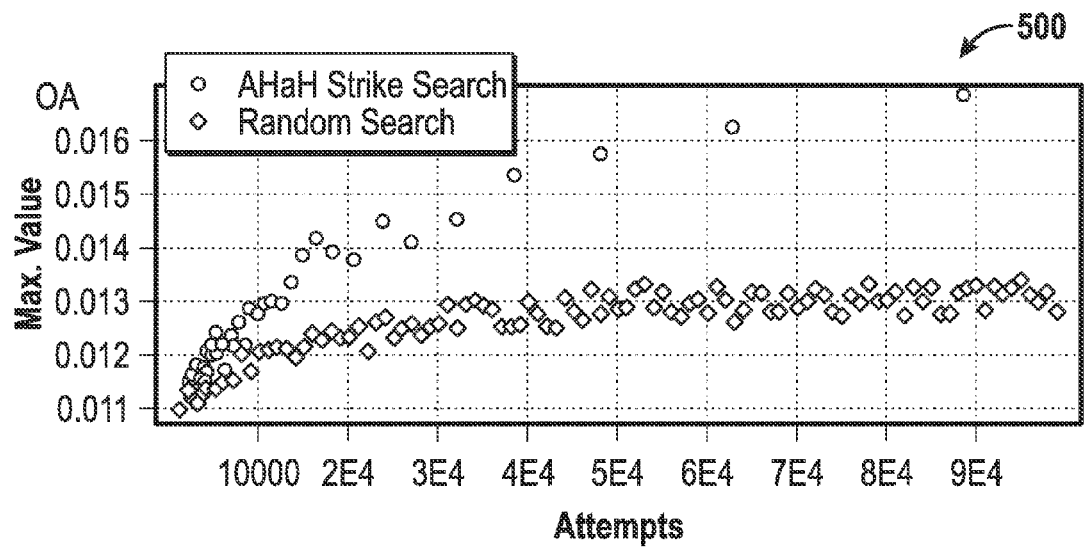
FIG. 13 illustrates graphs depicting data indicative of the 64-City traveling salesman challenge, in accordance with aspects the disclosed embodiments.
Figures 13B, 13C:
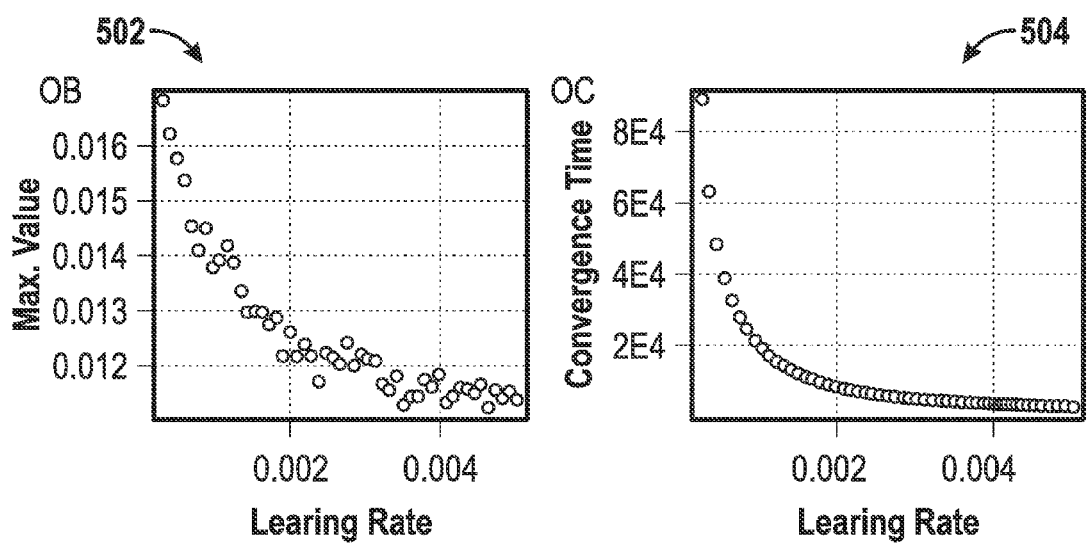

FIG. 13 illustrates graphs 500, 502, 404 depicting data indicative of the 64-City traveling salesman challenge, in accordance with aspects the disclosed embodiments. By using single-input AHaH Nodes as nodes in a routing tree, combinatorial optimization problems such as the traveling salesman problem can be solved in hardware. The speed and quality of the solution can be controlled by adjusting the duty cycle of the read and write phases driving of the AHaH Nodes. Graph 500 indicates the maximum solution value, V, (higher is better) as a function of the number of solution attempts. Graph 502 indicates lower learning rates lead to better solutions. Graph 504 indicates that lower learning rates increases convergence time.

We constructed a 64-city traveling salesman problem where each city is directly connected to every other city and the city coordinates were picked from a random Gaussian distribution with zero mean and a variance of one. The city path was encoded as a bit sequence such that the first city was encoded with 6 bits, and each successive city with only as many bits needed to resolve the remaining cities such that the second-to-last city required one bit. The value of the solution was computed as $V=1/d$ $V=1/a$, where d was the total path length.

The strike process was terminated after 50,000 attempts or when the same solution was generated 10 successive times. A random search was used as a control, where each new solution attempt was picked from a uniform random distribution. This was achieved by setting $\alpha=0$ $\alpha=0$. The results are summarized by graphs 500, 502 and 504 of FIG. 13. As the learning rate is decreased the quality of the solutions increases, but it takes longer to converge. The quality of solution is superior to a random search, indicating that the strike is performing a directed search.

A strike appears to be a relatively generic method to accelerate search algorithms. For example, we could just as easily encode the strike path as a relative procedure for re-ordering a list of cities rather than an absolute ordering. For example, we could swap the cities at indices "A" and "B", then swap the cities at indices "C" and "D", and so on. Furthermore, we could utilize the strike procedure in a recursive manner. For example, in the case of the traveling salesman problem we could assign "lower-level" strikes to find optimal sub-paths and higher-order strikes to assemble larger paths from the sub-paths.

Our work has demonstrated a path from meta-stable switches to a wide range of machine learning capabilities via a simple Anti-Hebbian and Hebbian building block. We have shown that memristive devices can arise from meta-stable switches, how differential synaptic weights may be built of two or more memristors, and how an AHaH Node may be built of two arrays of differential synapses. A simple read/write/decay cycle driving an AHaH Node circuit results in physical devices implementing the AHaH rule. We have demonstrated that the attractor states of the AHaH rule are computationally complete logic functions and have shown their use in spike encoding, supervised and unsupervised classification, clustering, complex signal prediction, unsupervised robotic arm actuation and combinatorial optimization. We have demonstrated unsupervised clustering and supervised classification in hardware simulations using accurate models of existing memristive devices. We have further shown a correspondence between our hardware simulations and a simple mathematical functional model.

We can infer from our results that other capabilities are clearly possible. Anomaly detection, for example, goes hand-in-hand with prediction. If a prediction can be made about a temporally dynamic signal then an anomaly signal can be easily generated should predictions fail to match with reality. Tracking of non-stationary statistics is also a natural by-product of the attractor nature of the AHaH rule. Attractor points of the AHaH rule are created by the data structure. It follows logically that these same states will shift as the structure of the information changes. It also follows that a system built of components locked in attractor states will spontaneously heal if damaged. We have demonstrated this in earlier work, but it should be emphasized that self-repair is a byproduct of decentralized self-organization. If a system can build itself then it can repair itself.

Emerging methods such as deep feature learning are currently gaining traction in the machine learning community. These methods build multiple layers of representations based on iterative applications of unsupervised methods such as auto-encoders. A sparse-spike encoding combined with an AHaH clusterer is capable of unsupervised feature extraction and could certainly be stacked to form higher-level representations. An AHaH classifier could furthermore be used as an auto-encoder, where input spikes become labels.

This is an exciting possibility, as recent work by Google™ to train deep learners on YouTube™ image data roughly doubled the accuracy from previous attempts. However, this result came with an eyebrow raising number. The effort took an array of 16,000 cores working at full capacity for 3 days. The model contained 1 billion connections, which although seemingly impressive pales in comparison to biology. The average human neocortex contains 150,000 billion connections and the number of synapses in the neocortex is a fraction of the total number of connections in the brain. At 20 W per core, Google's simulation consumed about 320 kW. Under perfect scaling, a human-scale neocortical simulation would have consumed 48 GW.

It is worth putting the above numbers into perspective. The largest power plant in the world at this time is the Three Gorges Dam in China with a capacity of 22.5 GW. It would take more than two of these facilities to power the computers required to simulate a portion of a human brain. 48 GW is a significant problem.

Circuits with billions of transistors are possible not because transistors are complicated but rather because they are simple. If we hope to build large-scale adaptive neuromorphic processors with quadrillions of adaptive synapses then we must necessarily begin with simple and robust building blocks.

As we have demonstrated in this paper, the AHaH Node may offer us such a building block. Indeed, we hope that our work demonstrates that functions needed to enable perception (clustering, classification), planning (combinatorial optimization, prediction), control (robotic actuation) and generic computation (universal logic) are possible with a simple circuit that does not just tolerate but actually requires volatility and noise.

Biology has evolved intelligent creatures built from volatile neural components, which have the ability to successfully navigate in and adapt to a constantly changing environment to seek and consume energy used to sustain and propagate life. The fact that living organisms can do what they do given limited energy budgets is furthermore astounding. Advances in computing, machine learning, and artificial intelligence have failed to even come close to the bar that nature has set. Therefore we believe a completely new approach to computing needs to be invented that is based on biology's volatile low-power solution. The research presented here proposes one such approach, avoiding the barriers hampering current von Neumann-based systems. The recent appearance of memristive circuits has now made it possible to add a synaptic-like electronic component to established silicon integrated devices paving the way for this new type of computing.

Our meta-stable switch model for memristors can be used to model, for example, two physical devices: the Ag-Chalcogenide device from Boise State University and the Ag—Si device from the University of Michigan. An adaptive synaptic weight can be formed from a differential pair of memristors and Anti-Hebbian and Hebbian plasticity. Differential arrays of synaptic weights are used to form a neural node circuit, the attractor states of which are logic functions that form a computationally complete set.

Furthermore, the disclosed embodiments demonstrate a path from low-level simulation of meta-stable switching elements to memristive devices, synaptic weights, neural nodes and finally high-level machine learning functions such as spike encoding, unsupervised clustering, supervised and unsupervised classification, complex signal prediction, unsupervised robotic actuation and combinatorial optimization—all of which are key capabilities of biological nervous systems as well as modern machine learning algorithms with real-world application. Finally, the disclosed embodiments demonstrate unsupervised clustering and supervised classification in memristor-level hardware simulations.

It can be appreciated that some aspects of the disclosed embodiments can be implemented in the context of hardware and other aspects of the disclosed embodiments can be implemented in the context of software. Still, other implementations of the disclosed embodiments may constitute a combination of hardware and software components. For example, in some embodiments, the memristive devices discussed herein may be implemented via physical components such as electrical circuits, etc, while other aspects of such memristive devices may operation according to computer based software instructions.

As will be appreciated by one of skill in the art, the disclosed embodiments can be implemented as a method, data-processing system, or computer program product. Accordingly, the embodiments may take the form of an entire hardware implementation (e.g., see IC 960/synaptic component 962 of FIGS. 16-17, an entire software embodiment or an embodiment combining software and hardware aspects all generally referred to as a "circuit" or "module". Some embodiments can be implemented in the context of, for example, an API (Application Program Interface)).

The disclosed approach may take the form of (in some embodiments), a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer or mobile device, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g. through the Internet via an internet service provider).

The embodiments are described at least in part herein with reference to graphs and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine, such that the instructions, which execute via the processor of the computer or other programmable data-processing apparatus, create means for implementing the functions/acts specified in the block or blocks discussed herein, such as, for example, the various instructions and methodology shown with respect to FIGS. 1-13.

These computer program instructions may also be stored in a computer-readable memory that can direct a computer or other programmable data-processing apparatus to function in a particular manner, such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 14:
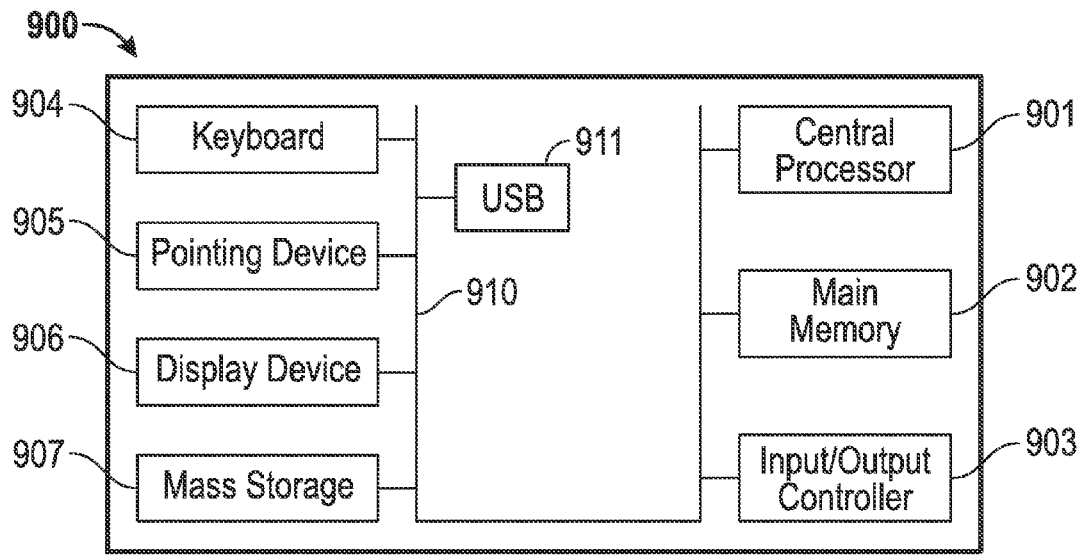
FIG. 14 illustrates a schematic view of a computer system, which can be implemented in accordance with one or more embodiments.
Figure 15:
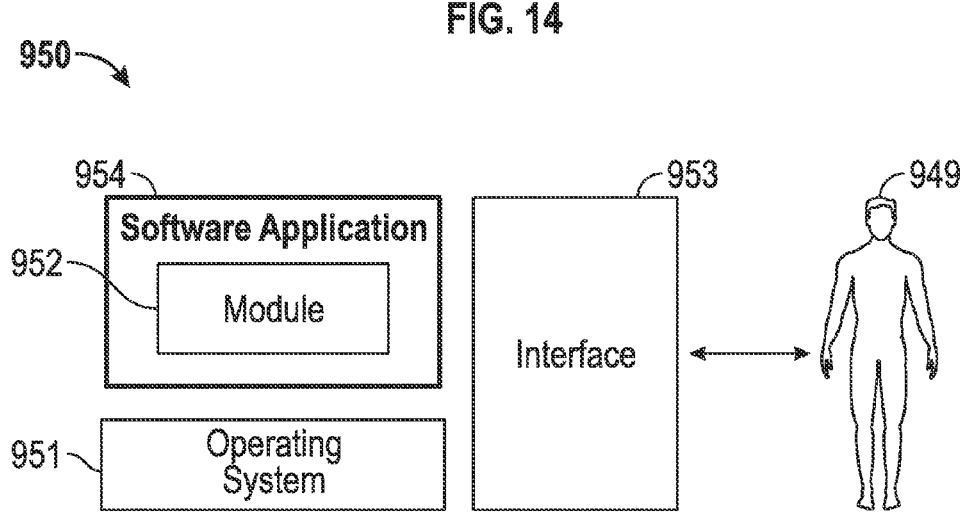
FIG. 15 illustrates a schematic view of a software system that can be employed for implementing a memristor-based universal machine learning block, in accordance with aspects of the disclosed embodiments.

FIGS. 14-15 are provided as diagrams of example data-processing environments in which embodiments of the present invention may be implemented. It should be appreciated that FIGS. 14-15 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 14, for example, some embodiments may be implemented in the context of a data-processing system 900 that can include, for example, a central processor 901 (or other processors), a main memory 902, an input/output controller 903, and in some embodiments, a USB (Universal Serial Bus) 911 or other appropriate peripheral connection.

System 900 can also include a keyboard 904, an input device 905 (e.g., a pointing device, such as a mouse, track ball, pen device, etc), a display device 906, and a mass storage 907 (e.g., a hard disk). As illustrated, the various components of data-processing system 900 can communicate electronically through a system bus 910 or similar architecture. The system bus 910 may be, for example, a subsystem that transfers data between, for example, computer components within data-processing system 900 or to and from other data-processing devices, components, computers, etc. The data-processing system 900 may be, for example, a desktop personal computer, a server, a wireless hand held device (e.g., Smartphone, table computing device such as an iPad, Android device, etc) or other types of computing devices.

FIG. 15 illustrates a computer software system 950, which may be employed for directing the operation of the data-processing system 900 depicted in FIG. 9. Software application 954, stored in main memory 902 and on mass storage 907 generally can include and/or can be associated with a kernel or operating system 951 and a shell or interface 953. One or more application programs, such as module(s) 952, may be "loaded" (i.e., transferred from mass storage 907 into the main memory 902) for execution by the data-processing system 900. In the example shown in FIG. 15, module 952 can be implemented as, for example, a module that performs one or more of the logical instructions or operations shown and discussed herein with respect to FIGS. 1-13. Module 952 can in some embodiments be implemented as an AHaH module and/or an API module.

The data-processing system 900 can receive user commands and data through user interface 953 accessible by a user 949. These inputs may then be acted upon by the data-processing system 900 in accordance with instructions from operating system 951 and/or software application 954 and any software module(s) 952 thereof.

The discussion herein is thus intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules (e.g., module 952) can include, but are not limited to routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, mini-computers, mainframe computers, servers, and the like.

Note that the term module as utilized herein may refer to a physical device (e.g., an integrated circuit, an API block, etc.) and/or a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application, such as a computer program designed to assist in the performance of a specific task, such as pattern recognition, machine learning, etc.

The interface 953 (e.g., a graphical user interface), can serve to display results, whereupon a user may supply additional inputs or terminate a particular session. In some embodiments, operating system 951 and interface 953 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 951 and interface 953. The software application 954 can include, for example, module 952, which can include instructions for carrying out steps or logical operations such as those shown and described herein with respect to FIGS. 1-13.

FIGS. 14-15 are thus intended as examples, and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms, including Macintosh, Unix, Linux, and the like.

Figure 16:
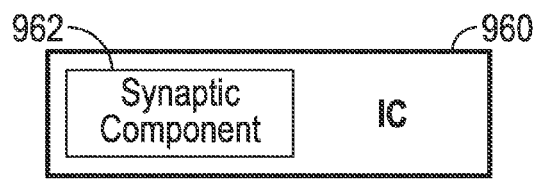
FIGS. 16-17 illustrate alternative examples of a synaptic component module that can be integrated with or associated with an electronic integrated circuit (IC).
Figure 17:
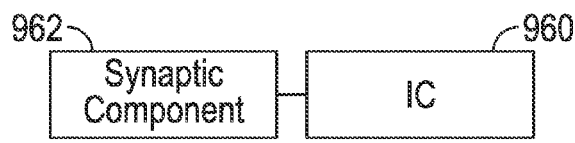

FIGS. 16-17 illustrate alternative examples of a synaptic component module 962 that can be associated and/or integrated with an electronic integrated circuit (IC) 960. The IC 962 can constitute be implemented as a MNP (Memristive Neural Processor)—a memristor-based universal machine learning building block as discussed and illustrated herein with respect to FIGS. 1-13. Such a building block or physical module 962 (as opposed to a software module) can be integrated with the IC 960 as shown in FIG. 16 or can be associated with the IC 960 as shown in FIG. 17. The module 962 thus functions as a memory and processing device that can be implemented as physically adaptive hardware as opposed to software applications such as shown and discussed with respect to FIGS. 14-15.

The configuration shown in FIGS. 16-17 although implemented in the context of a physical IC chip can also be implemented in associate with software, such as shown in FIGS. 14-15. Module 962 may be, for example, a universal machine learning building block circuit, comprising a differential pair of output electrodes, wherein each electrode comprises one or more input lines coupled to it via collections of meta-stable switches such as the MSS components discussed previously herein.

Note that in some embodiments, the IC 960 with the synaptic component 962 can replace the processor 901 and main memory 902 shown in FIG. 14. In such an example, the IC 960 (which includes or is associated with the synaptic component 962) can be connected to the bus 910 shown in FIG. 14, since the synaptic component 962 encompasses both processor and memory functions as discussed herein. That is, synaptic component 962 can function as a processor that is a memory, and a memory that is a processor.

Synaptic component 962 is a memristor-based universal machine learning building block that can include one or more meta-stable switches, and a differential pair of output electrodes, wherein each electrode among the differential pair of output electrodes can include a group of input lines coupled thereto via the meta-stable switch(s). Synaptic component 962 thus constitutes a new type of physically adaptive hardware in which memory and processor are merged. In an IC implementation, such as IC 960, the IC 960 (including synaptic component 962) can be adapted for use with computing devices including, but not limited to, Smartphones, computers, servers, pad-computing devices, and so forth.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. An AHaH (Anti-Hebbian and Hebbian) apparatus for use in electronic circuits, said apparatus comprising:
    at least one meta-stable switch driven by an AHaH rule; and
    a differential pair of output electrodes, wherein each electrode among said differential pair of output electrodes comprises a plurality of input lines coupled thereto via said at least one meta-stable switch.

2. The apparatus of claim 1 wherein said at least one meta-stable switch comprises a two-state element that switches probabilistically between two states as a function of applied bias and temperature.

3. The apparatus of claim 1 further comprising at least one AHaH node comprising said at least one metal-stable switch and said differential pair of output electrodes.

4. The apparatus of claim 3 further comprising an AHaH classifier that includes said at least one AHaH node.

5. The apparatus of claim 3 further comprising an AHaH clusterer that includes said at least one AHaH node.

6. The apparatus of claim 2 further comprising at least one AHaH node comprising said at least one metal-stable switch and said differential pair of output electrodes.

7. The apparatus of claim 6 further comprising an AHaH classifier that includes said at least one AHaH node.

8. The apparatus of claim 6 further comprising an AHaH clusterer that includes said at least one AHaH node.

9. The apparatus of claim 1 further comprising a synaptic component comprising said at least one meta-stable switch and said differential pair of output electrodes.

10. A memristor for use in electronic circuits, said memristor comprising:
    at least one AHaH node comprising at least one meta-stable switch driven by an AHaH rule and a differential pair of output electrodes;
    a plurality of input lines, wherein each electrode among said differential pair of output electrodes comprises said plurality of input lines coupled thereto via said at least one meta-stable switch.

11. The memristor of claim 10 wherein said at least one meta-stable switch comprises a two-state element that switches probabilistically between two states as a function of applied bias and temperature.

12. The memristor of claim 10 further comprising an AHaH classifier that includes said at least one AHaH node.

13. The memristor of claim 10 further comprising an AHaH clusterer that includes said at least one AHaH node.

14. The memristor of claim 11 further comprising an AHaH classifier that includes said at least one AHaH node.

15. The memristor of claim 11 further comprising an AHaH clusterer that includes said at least one AHaH node.

16. The memristor of claim 10 further comprising a synaptic component comprising said at least one meta-stable switch and said differential pair of output electrodes.

17. A memristive neural processor comprising an integrated circuit chip, said integrated circuit chip comprising:
    a substrate;
    at least one meta-stable switch configured upon said substrate, said at least one meta-stable switch driven by an AHaH rule; and
    a differential pair of output electrodes configured upon said substrate, wherein each electrode among said differential pair of output electrodes comprises a plurality of input lines coupled thereto via said at least one meta-stable switch.

18. The memristive neural processor of claim 17 wherein said at least one meta-stable switch comprises a two-state element that switches probabilistically between two states as a function of applied bias and temperature.

19. The memristive neural processor of claim 17 further comprising at least one AHaH node comprising said at least one metal-stable switch and said differential pair of output electrodes.

20. The memristive neural processor of claim 18 further comprising at least one AHaH node comprising said at least one metal-stable switch and said differential pair of output electrodes.

* * * * *